US008891823B2

(12) United States Patent
Sato

(10) Patent No.: US 8,891,823 B2
(45) Date of Patent: Nov. 18, 2014

(54) APPARATUS, CONTROL METHOD, AND STORAGE MEDIUM FOR ACQUIRING AND STORING POSITION INFORMATION IN ASSOCIATION WITH IMAGE DATA

(75) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/479,368

(22) Filed: May 24, 2012

(65) Prior Publication Data

US 2012/0308081 A1    Dec. 6, 2012

(30) Foreign Application Priority Data

May 31, 2011   (JP) .................................. 2011-122596
May 21, 2012   (JP) .................................. 2012-115904

(51) Int. Cl.
| G06K 9/00 | (2006.01) |
| G01S 5/00 | (2006.01) |
| G01S 5/02 | (2010.01) |
| H04N 1/32 | (2006.01) |
| H04N 1/00 | (2006.01) |
| H04N 101/00 | (2006.01) |

(52) U.S. Cl.
CPC ............. *G01S 5/0027* (2013.01); *G01S 5/0252* (2013.01); *H04N 1/32101* (2013.01); *H04N 1/32122* (2013.01); *H04N 2201/3277* (2013.01); *H04N 1/00323* (2013.01); *H04N 2101/00* (2013.01); *H04N 2201/0084* (2013.01); *H04N 2201/3274* (2013.01); *H04N 2201/3253* (2013.01)
USPC ......................................................... 382/103

(58) Field of Classification Search
None
See application file for complete search history.

(56) References Cited

U.S. PATENT DOCUMENTS

| 5,506,644 | A  | * | 4/1996 | Suzuki et al. ................. 396/319 |
| 5,768,640 | A  | * | 6/1998 | Takahashi et al. ............ 396/310 |
| 6,298,229 | B1 | * | 10/2001 | Tomlinson et al. ........ 455/404.2 |
| 6,320,173 | B1 | * | 11/2001 | Vock et al. ................. 250/206.1 |
| 7,746,388 | B2 | * | 6/2010 | Jeon ........................... 348/231.2 |
| 8,571,378 | B2 | * | 10/2013 | Morimoto ..................... 386/239 |
| 2004/0267419 | A1 | * | 12/2004 | Jeng ................................ 701/36 |
| 2008/0089557 | A1 | * | 4/2008 | Iwaki et al. ................... 382/106 |
| 2008/0117309 | A1 | * | 5/2008 | Jeon ........................... 348/231.2 |
| 2009/0271111 | A1 | * | 10/2009 | Takanashi et al. ............ 701/209 |
| 2010/0057350 | A1 | * | 3/2010 | Joly et al. ...................... 701/207 |
| 2010/0284627 | A1 | * | 11/2010 | Lin et al. ....................... 382/275 |
| 2011/0260917 | A1 | * | 10/2011 | Street et al. .............. 342/357.75 |
| 2012/0308081 | A1 | * | 12/2012 | Sato ............................. 382/103 |

FOREIGN PATENT DOCUMENTS

JP    2008-072228 A    3/2008

* cited by examiner

*Primary Examiner* — Tahmina Ansari
(74) *Attorney, Agent, or Firm* — Carter, DeLuca, Farrell & Schmidt, LLP

(57) ABSTRACT

A position information acquiring apparatus comprises: a first acquiring unit configured to acquire first position information of the position information acquiring apparatus upon image capturing; a first storage unit configured to store image data generated by the image capturing and the first position information in a memory in association with each other; a second acquiring unit configured to acquire second position information of the position information acquiring apparatus upon image capturing; and a second storage unit configured to store the second position information in the memory in association with the image data when the second position information higher in accuracy than the first position information is acquired after the first storage unit stores the image data and the first position information in association with each other.

10 Claims, 30 Drawing Sheets

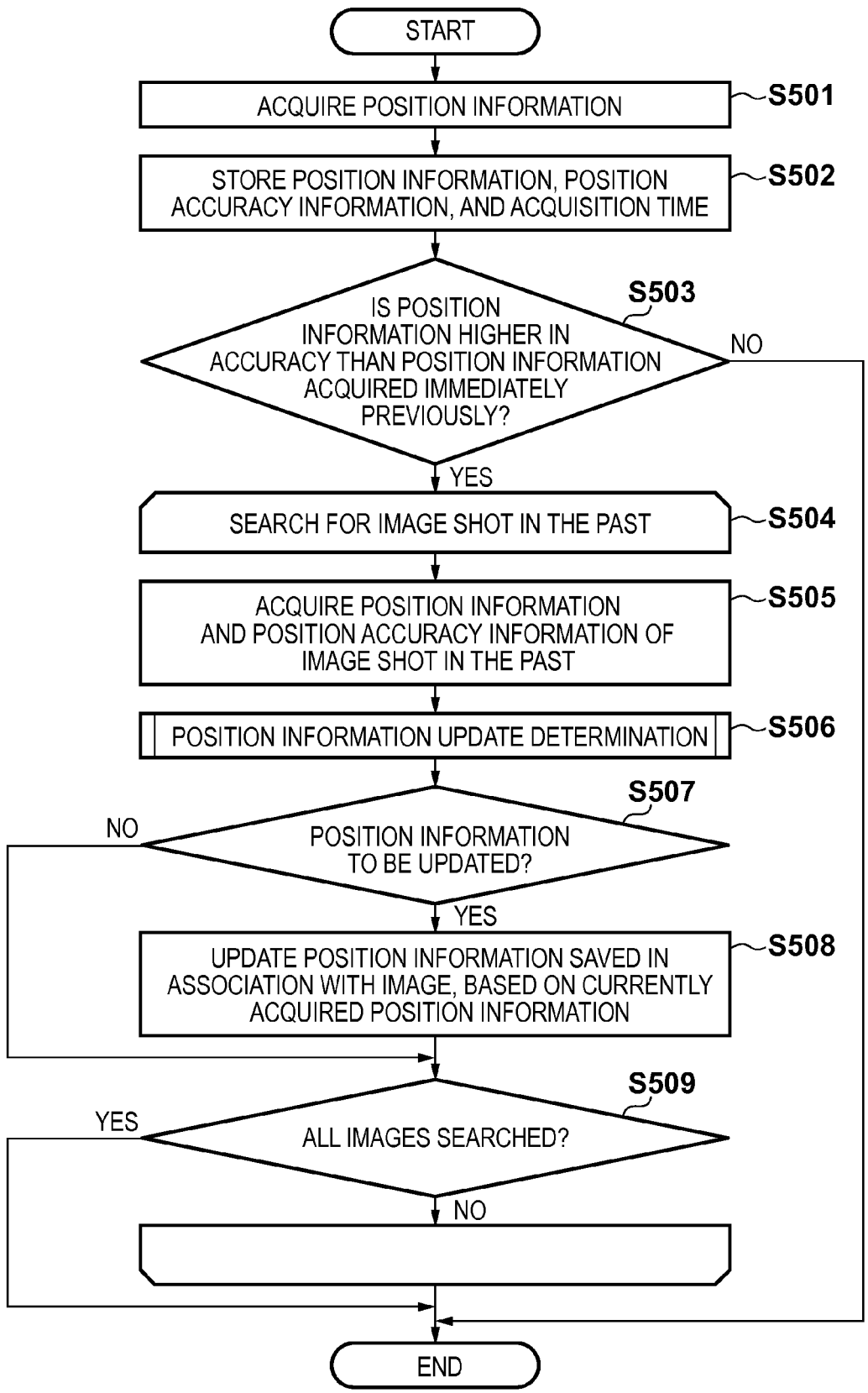

| No | MEASUREMENT DATE & TIME | MOVING DISTANCE | |
|---|---|---|---|
| | | LATITUDE | NORTH-SOUTH DIRECTION |
| 1 | 2010-12-24 11:30:00:00 | 0.000000 | 0.000000 |
| 2 | 2010-12-24 11:30:10:00 | 1.000000 | 0.000000 |
| 3 | 2010-12-24 11:30:20:00 | 1.250000 | -0.750000 |
| 4 | 2010-12-24 11:30:40:00 | 2.250000 | -0.500000 |
| 5 | 2010-12-24 11:31:00:00 | 2.500000 | -0.500000 |
| 6 | 2010-12-24 11:31:15:00 | 2.500000 | -1.250000 |
| 7 | 2010-12-24 11:31:45:00 | 3.500000 | -1.750000 |
| 8 | 2010-12-24 11:32:00:00 | 3.250000 | -2.250000 |

| IMAGE ID | SHOOTING DATE & TIME | POSITION INFORMATION | | ACCURACY INFORMATION |
|---|---|---|---|---|
| | | LATITUDE | LONGITUDE | |
| IMG 0001 | 2010-12-24 11:30:05:00 | 35.680422 | 139.769542 | RADIUS 1000m |
| IMG 0002 | 2010-12-24 11:31:15:00 | 35.680374 | 139.769550 | RADIUS 1000m |
| IMG 0003 | 2010-12-24 11:31:45:00 | 35.680363 | 139.769598 | RADIUS 1000m |

702 704 703 705 706

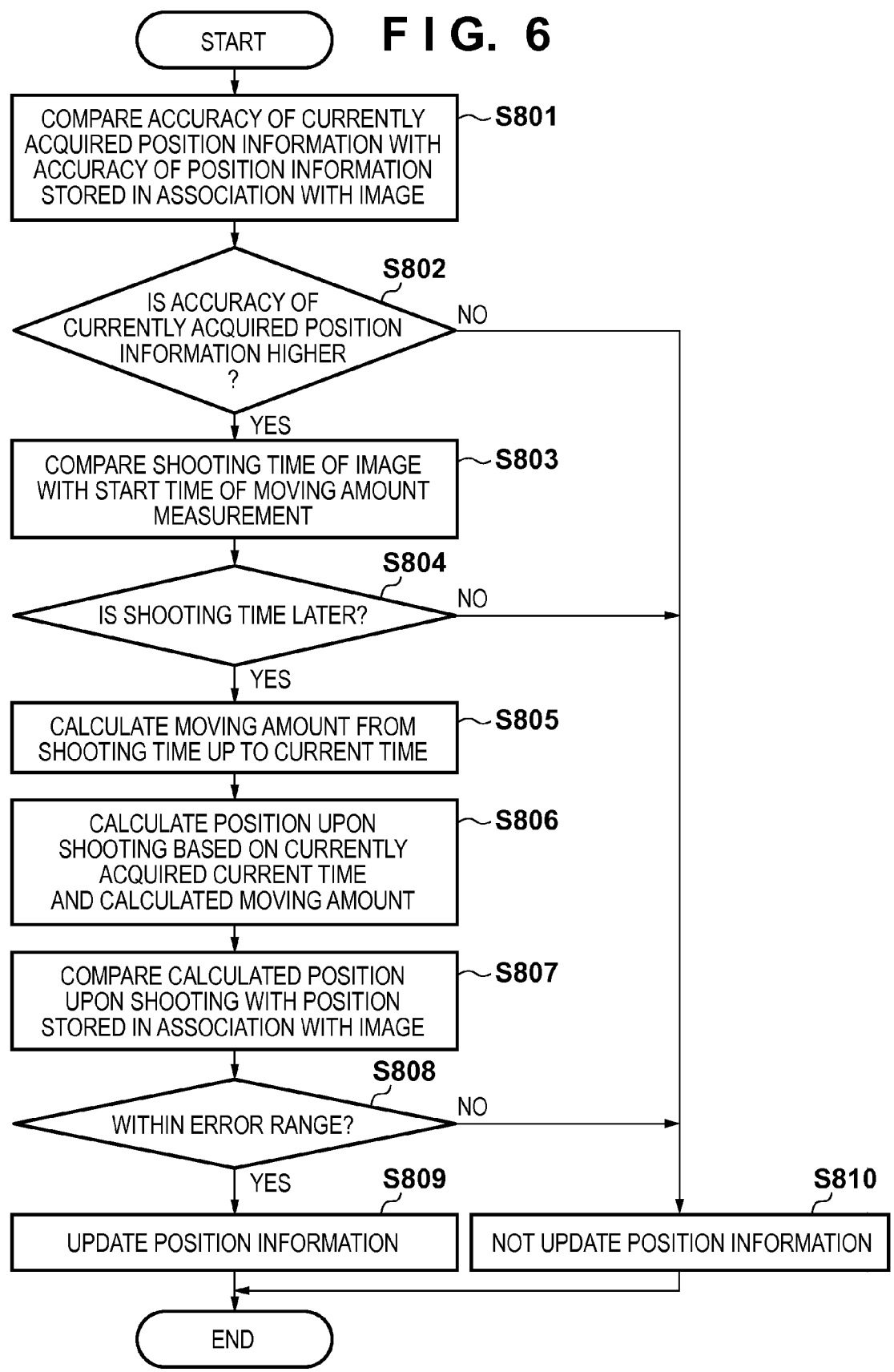

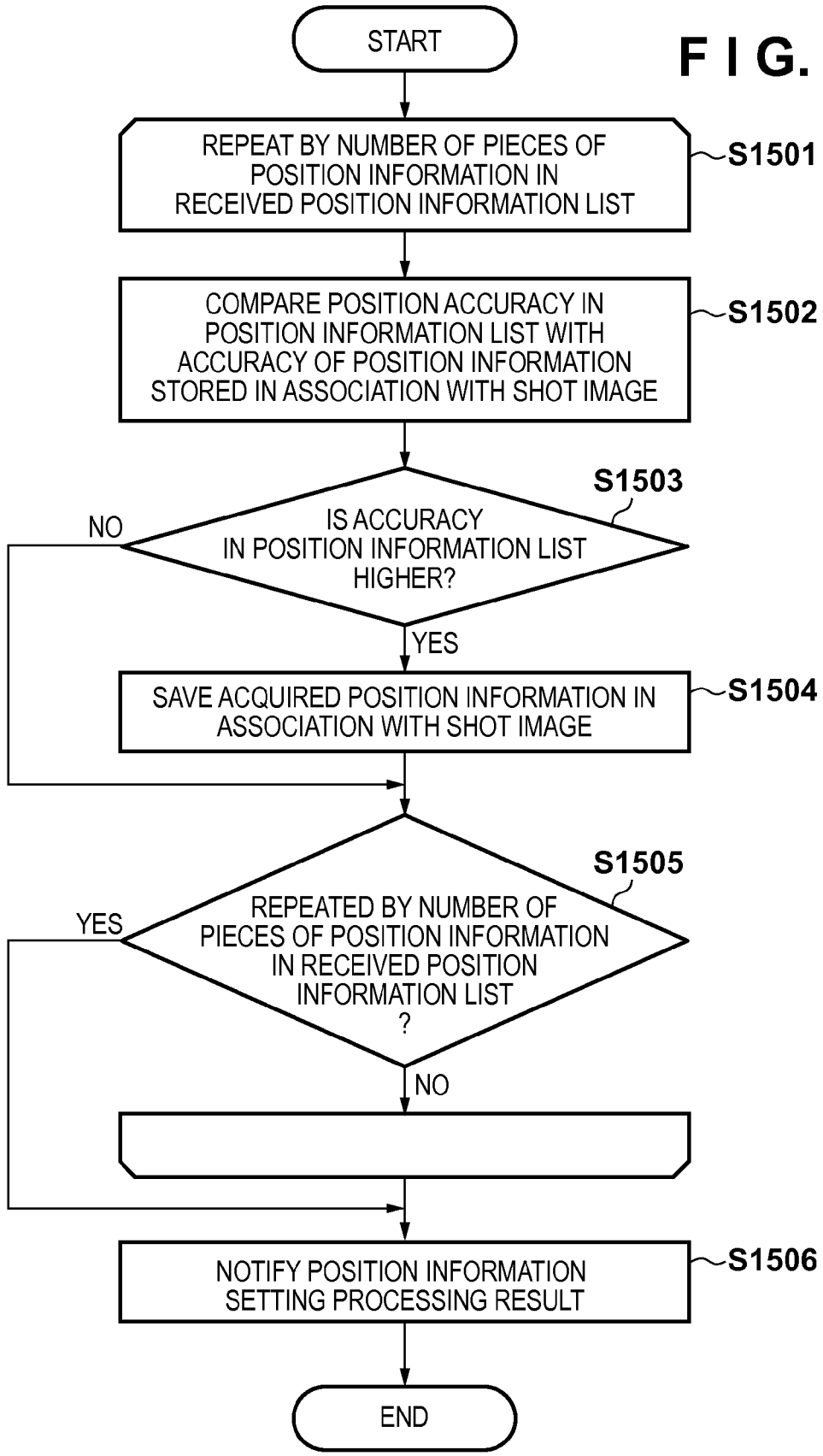

F I G. 15

| POSITIONING DATE & TIME | POSITION INFORMATION | | ACCURACY INFORMATION |
|---|---|---|---|
| | LATITUDE | LONGITUDE | |
| 2010-12-24 11:30:05:00 | 35.680422 | 139.769542 | RADIUS 1000m |
| 2010-12-24 11:31:15:00 | 35.680374 | 139.769550 | RADIUS 1000m |
| 2010-12-24 11:31:45:00 | 35.680363 | 139.769598 | RADIUS 1000m |
| 2010-12-24 11:32:10:00 | 35.680355 | 139.769602 | RADIUS 10m |
| 2010-12-24 11:32:20:00 | 35.680351 | 139.769606 | RADIUS 10m |

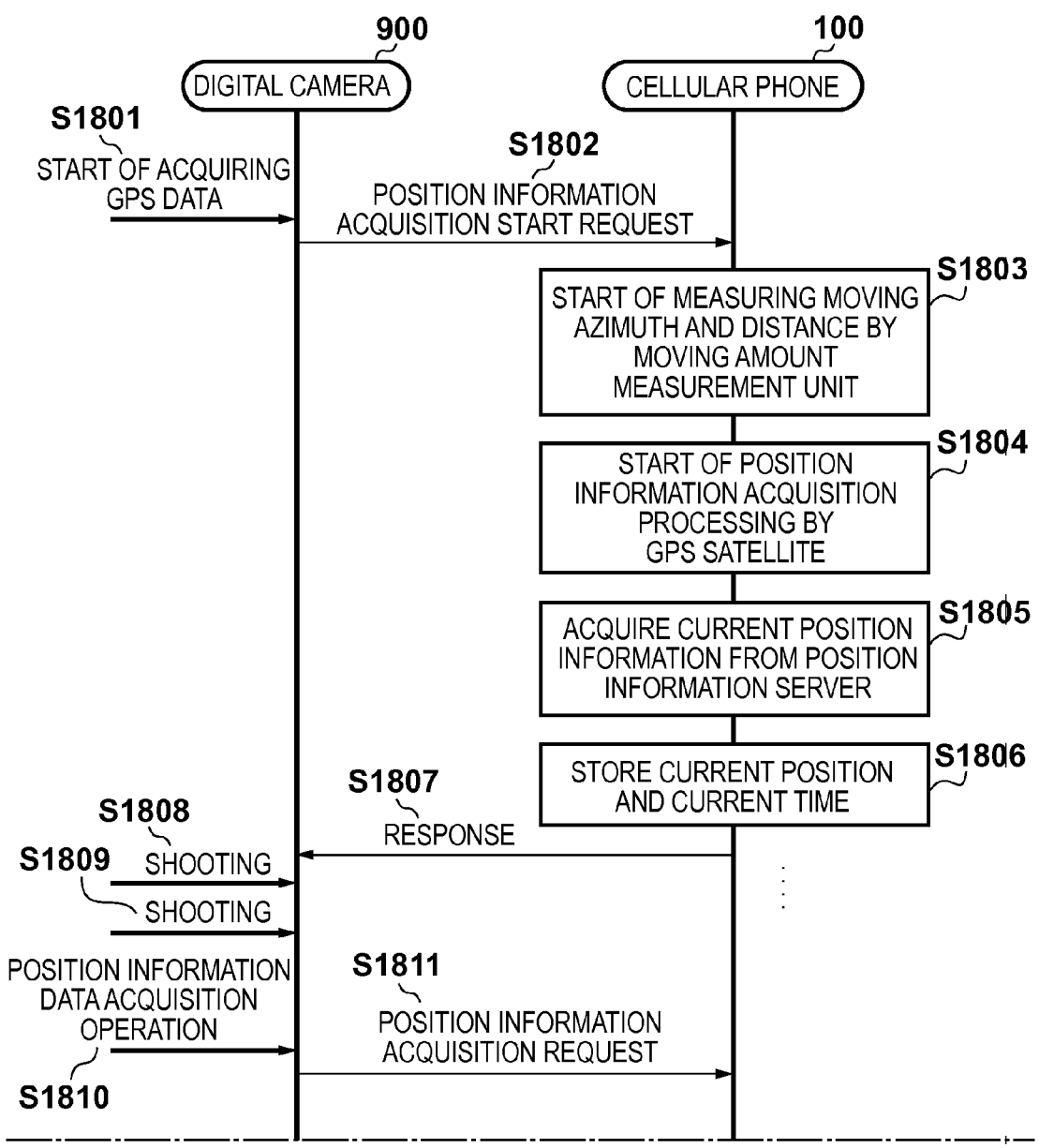

F I G. 16B
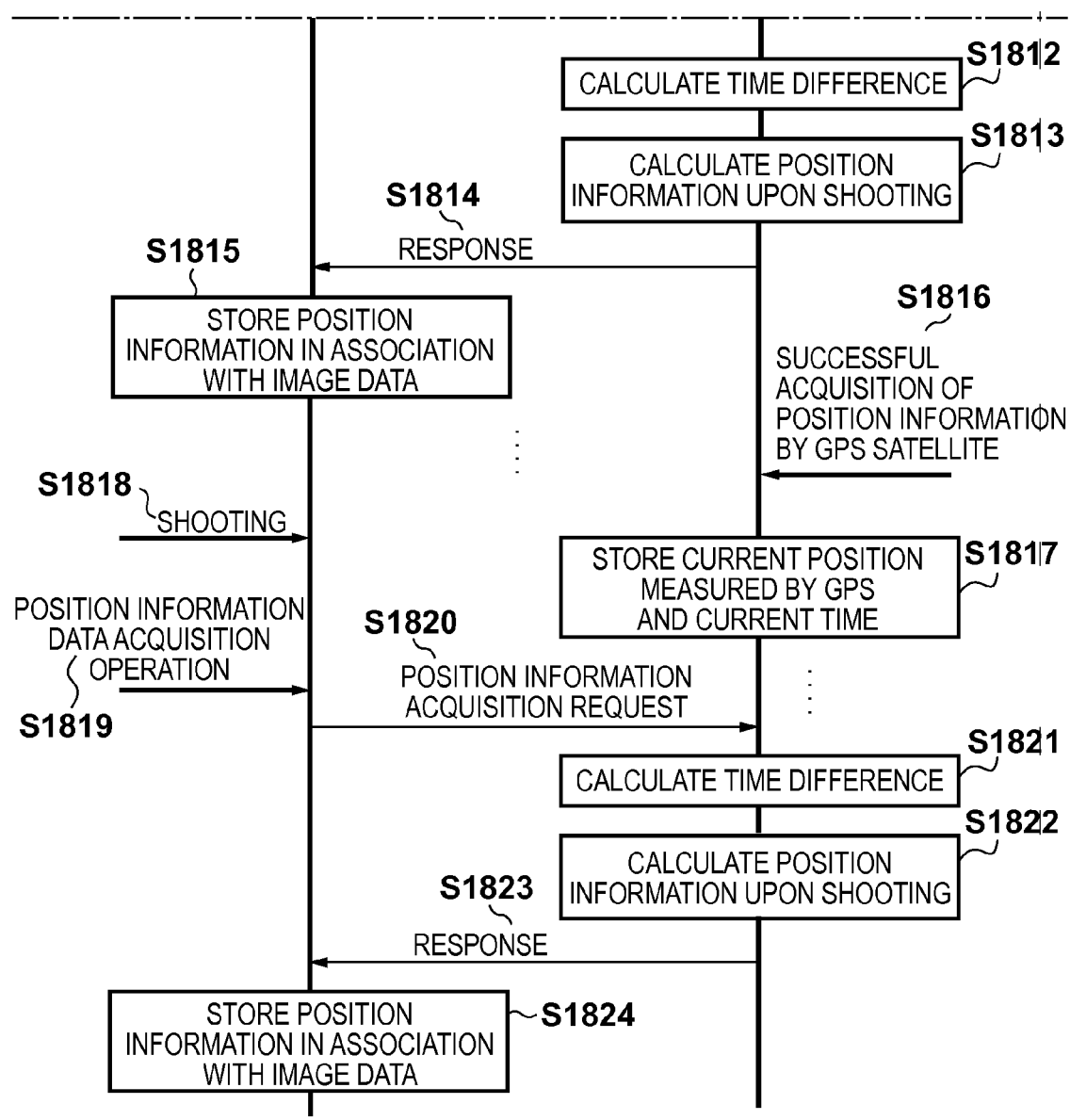

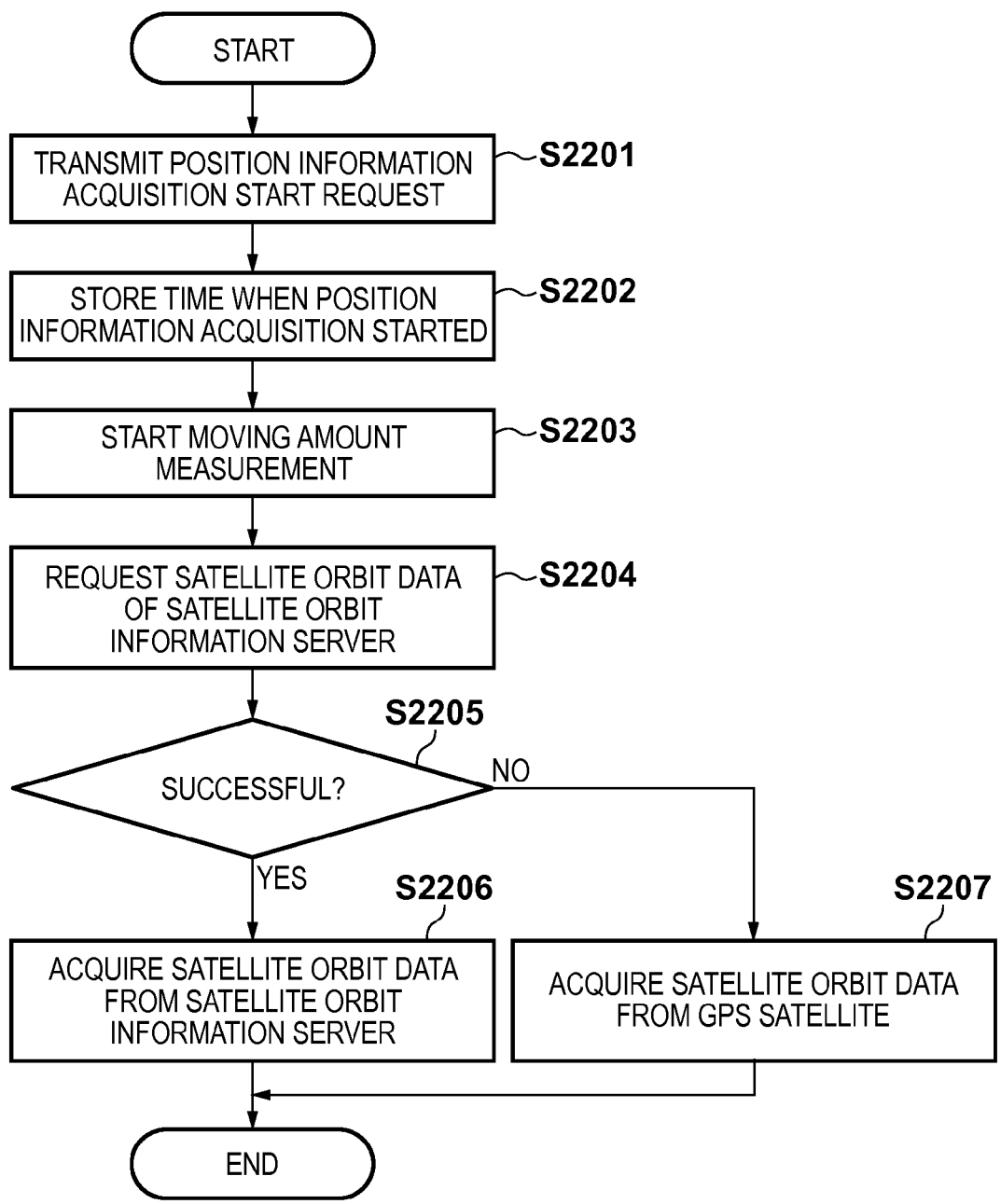

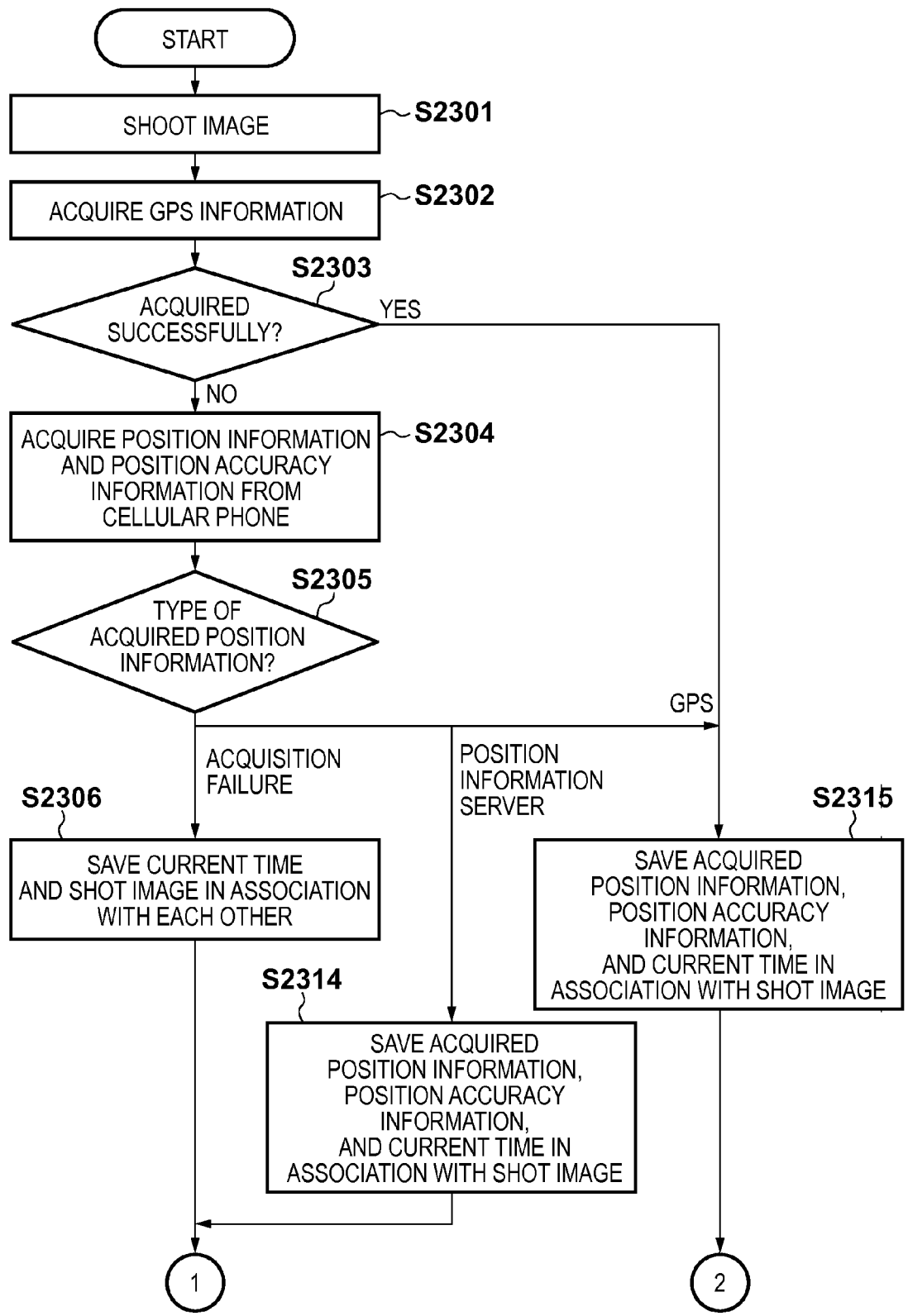

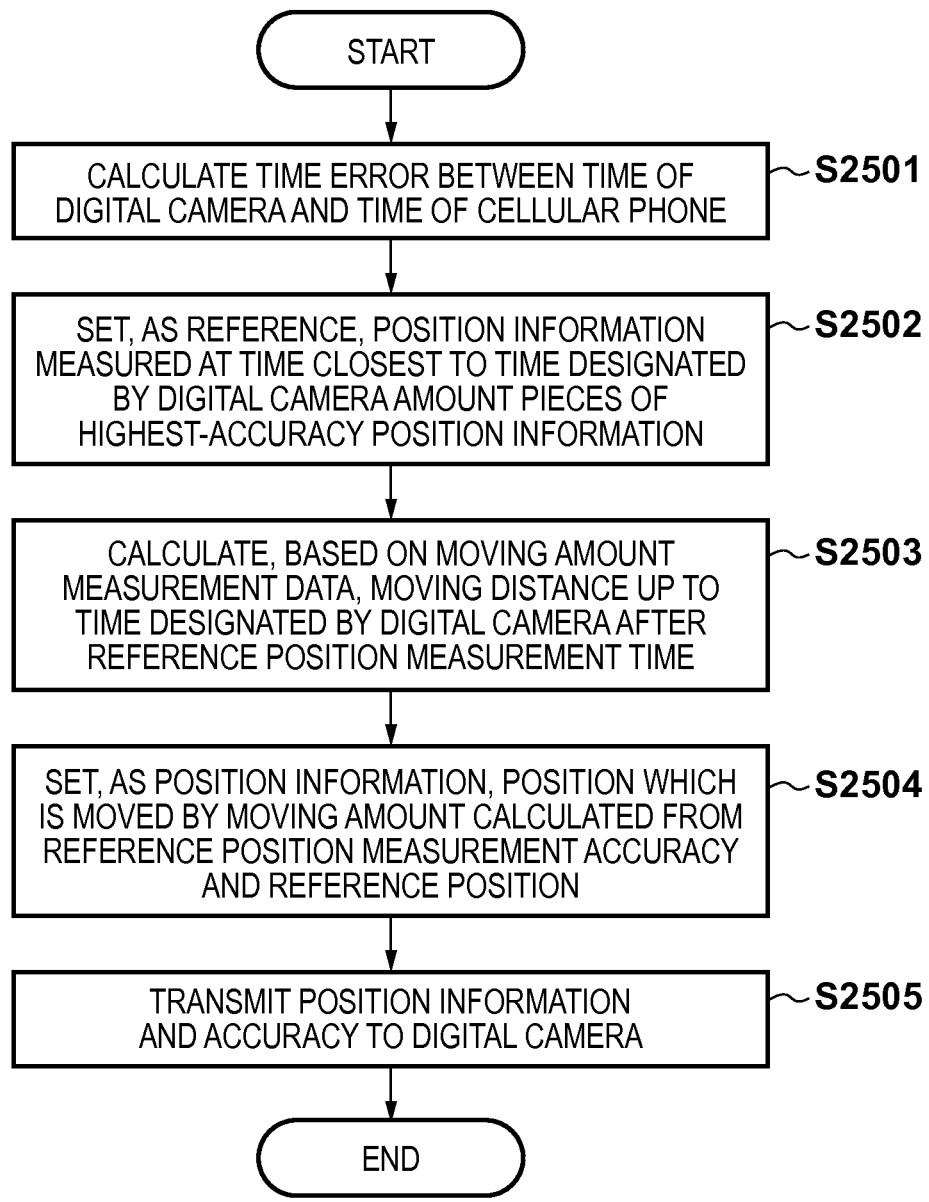

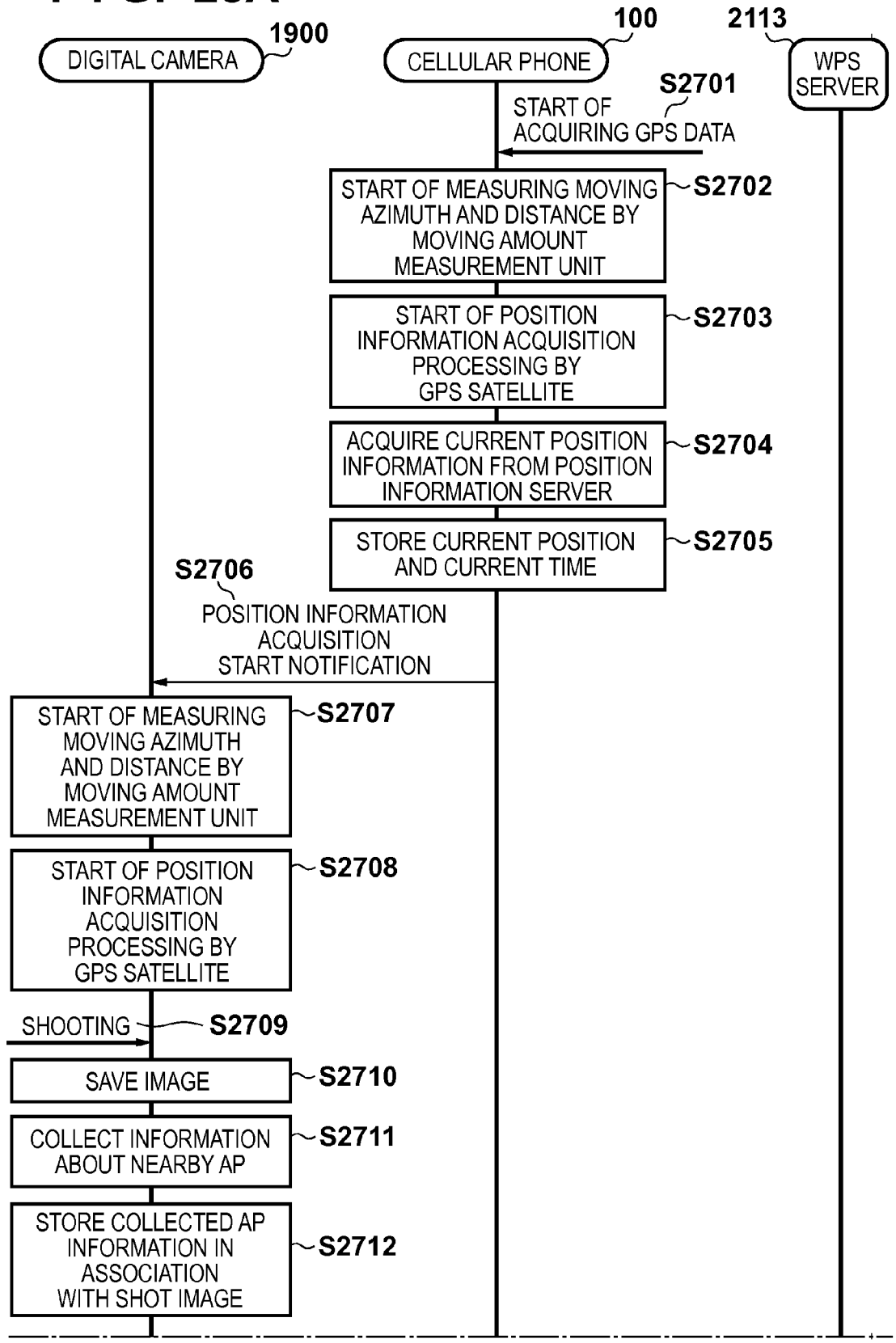

APPARATUS, CONTROL METHOD, AND STORAGE MEDIUM FOR ACQUIRING AND STORING POSITION INFORMATION IN ASSOCIATION WITH IMAGE DATA

BACKGROUND OF THE INVENTION

1. Field of the Invention

The present invention relates to a position information acquiring apparatus, position information acquiring apparatus control method, and storage medium and, more particularly, to a position information acquiring apparatus and position information acquiring apparatus control method for acquiring position information and saving it in association with a captured image, and a storage medium.

2. Description of the Related Art

Recently, cellular phones which acquire position information have prevailed. This cellular phone acquires its position information according to a method of acquiring position information using a GPS satellite or a method of acquiring position information using radio waves from a base station. The method using a GPS satellite has high position information accuracy, but takes a long time until it acquires position information. In contrast, the method using radio waves from a base station has low position information accuracy, but takes a short time until it acquires position information. Under the circumstance, some cellular phones first acquire position information using radio waves from a base station, and then acquire position information using a GPS satellite.

An example of a system which acquires position information using radio waves from a base station is a Wi-Fi positioning system (to be referred to as WPS). The WPS acquires the position of a cellular phone based on the relative position between a position-specified base station and the cellular phone using a wireless signal originated from the base station.

Also, there are a device and system which store position information upon image capturing in association with a shot image (Japanese Patent Laid-Open No. 2008-72228).

When storing position information in association with a captured image, position information acquired upon image capturing is stored. Even if position information higher in accuracy than the position information acquired upon image capturing is acquired after image capturing, the position information stored in association with the captured image remains unchanged from low-accuracy position information acquired upon captured image.

To solve the above problem, the present invention provides a technique of increasing the accuracy of stored position information when storing position information upon image capturing.

SUMMARY OF THE INVENTION

According to one aspect of the present invention, there is provided a position information acquiring apparatus comprising: a first acquiring unit configured to acquire first position information of the position information acquiring apparatus upon image capturing; a first storage unit configured to store image data generated by the image capturing and the first position information in a memory in association with each other; a second acquiring unit configured to acquire second position information of the position information acquiring apparatus upon image capturing; and a second storage unit configured to store the second position information in the memory in association with the image data when the second position information higher in accuracy than the first position information is acquired after the first storage unit stores the image data and the first position information in association with each other.

According to another aspect of the present invention, there is provided a method for controlling a position information acquiring apparatus, comprising: acquiring first position information of the position information acquiring apparatus upon image capturing; storing image data generated by the image capturing and the first position information in a memory in association with each other; acquiring second position information of the position information acquiring apparatus upon image capturing; and storing the second position information in the memory in association with the image data when the second position information higher in accuracy than the first position information is acquired after the image data and the first position information are stored in association with each other in the storing image data.

Further features of the present invention will be apparent from the following description of exemplary embodiments with reference to the attached drawings.

BRIEF DESCRIPTION OF THE DRAWINGS

FIG. 4 is a flowchart showing an operation sequence when an image capturing apparatus 100 acquires position information;

FIG. 5A is a table exemplifying the structure of moving amount measurement data recorded by a position information acquiring apparatus or the image capturing apparatus in an embodiment of the present invention;

FIG. 5B is a table exemplifying the data structure of position information recorded in association with a shot image by the image capturing apparatus in the embodiment of the present invention;

FIG. 6 is a flowchart showing the operation sequence of processing to determine whether to update position information saved in association with an image;

FIG. 13 is a flowchart showing an operation sequence by the image capturing apparatus in the second embodiment;

FIG. 15 is a table exemplifying the data structure of position information recorded by the position information acquiring apparatus in the second or third embodiment;

FIGS. 16A and 16B are sequence charts exemplifying an operation in the second embodiment;

FIG. 20 is a flowchart showing an operation sequence by the image capturing apparatus in the third embodiment;

FIGS. 21A and 21B are flowcharts showing an operation sequence by the image capturing apparatus in the third embodiment;

FIG. 23 is a flowchart showing an operation sequence by a position information acquiring apparatus in the third embodiment;

FIGS. 25A and 25B are sequence charts exemplifying an operation in the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
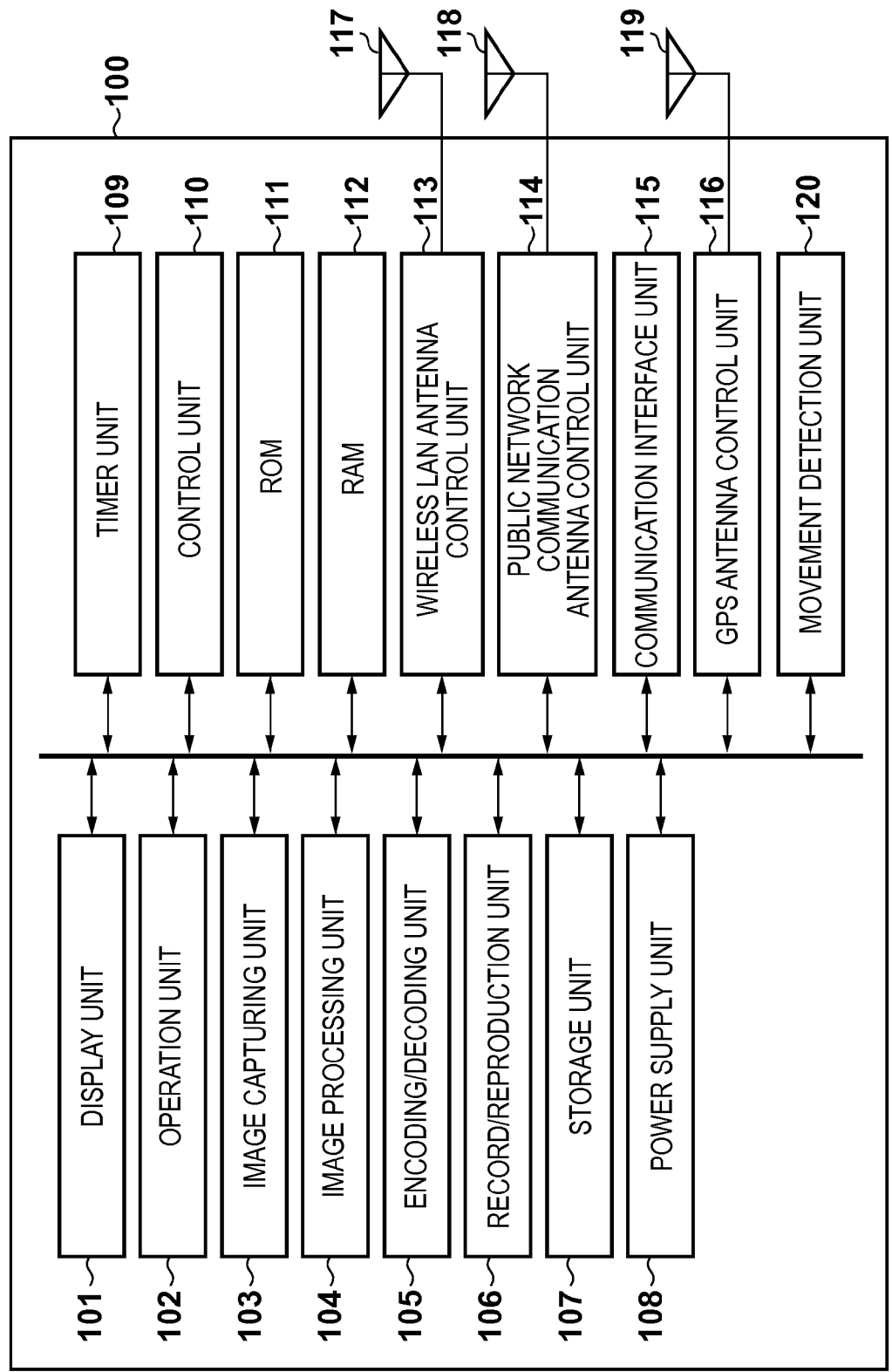
FIG. 1 is a block diagram exemplifying the hardware arrangement of an image capturing apparatus.

An image capturing apparatus according to the first embodiment will be described in detail with reference to the accompanying drawings. FIG. 1 is a block diagram showing the hardware arrangement of the image capturing apparatus according to the present invention. An image capturing apparatus 100 is, for example, a camera-equipped cellular phone in the embodiment. The image capturing apparatus 100 includes a display unit 101, operation unit 102, image capturing unit 103, image processing unit 104, encoding/decoding unit 105, record/reproduction unit 106, storage unit 107, power supply unit 108, timer unit 109, control unit 110, ROM 111, RAM 112, wireless LAN antenna control unit 113, public network communication antenna control unit 114, communication interface unit 115, GPS antenna control unit 116, wireless LAN antenna 117, public network communication antenna 118, GPS antenna 119, and movement detection unit 120. Note that the storage unit 107 is formed from a nonvolatile memory.

The display unit 101 and operation unit 102 perform display and execution of an application, and the like. The image capturing unit 103 captures an optical image of an object to generate image data. The image processing unit 104 converts an image captured by the image capturing unit 103 into image data of a predetermined format, and adds watermark data to the image data. The encoding/decoding unit 105 performs predetermined high-efficiency encoding (for example, DCT transform and variable-length encoding after quantization) for the image data output from the image processing unit 104.

The encoding/decoding unit 105 also decompression-decodes compressed image data reproduced by the record/reproduction unit 106, and supplies the image data to the image processing unit 104. The record/reproduction unit 106 records compression-encoded image data on a recording medium (not shown), and reproduces it. A communication device in the embodiment compression-encodes image data using, for example, the JPEG (Joint Photographic Experts Group) as a technique of encoding image data. The storage unit 107 stores and manages various data such as wireless communication network information, data transmission/reception information, communication device information, and captured image information. The power supply unit 108 is, for example, a battery.

The timer unit 109 functions as a timer which measures time. The control unit 110 is, for example, a CPU, and controls the operations of the respective building components of the image capturing apparatus 100. The ROM 111 stores control instructions, that is, programs. The RAM 112 is used as a work memory and an area for temporarily saving data when executing a program. The wireless LAN antenna control unit 113 controls the wireless LAN antenna 117. The public network communication antenna control unit 114 controls the public network communication antenna 118. The communication interface unit 115 (to be also referred to as a "communication I/F") is an interface for performing communication processing including network search, construction, connection, and management. The GPS antenna control unit 116 controls the GPS antenna 119. The wireless LAN antenna 117 is an antenna for performing wireless LAN communication. The public network communication antenna 118 is an antenna for performing public network communication. The GPS antenna 119 is an antenna for capturing radio waves from a GPS (Global Positioning System) satellite. The movement detection unit 120 measures the relative moving direction and moving distance of the image capturing apparatus 100. Examples of the movement detection unit 120 are an acceleration sensor and gyroscope. In the embodiment, an acceleration sensor and electronic compass are used as the movement detection unit 120.

The functional blocks of the image capturing apparatus 100 will be explained with reference to FIG. 2. In the embodiment, the functional blocks of the image capturing apparatus 100 are stored as programs in the ROM 111. These functions are implemented by executing the programs by the control unit 110. Note that some or all of the functional blocks of the image capturing apparatus 100 may be implemented by hardware components.

The image capturing apparatus 100 includes a captured image data storage unit 210, position data acquiring unit 220, time acquiring unit 230, moving amount measurement unit 240, position data analysis unit 250, and position information notification processing unit 260.

The captured image data storage unit 210 stores and manages image data, and metadata associated with the image data. The captured image data storage unit 210 stores and manages, in association with each other, image data captured by the image capturing unit 103, position information acquired by the position data acquiring unit 220, image capturing time acquired by the time acquiring unit 230, and position accuracy information acquired by the position data analysis unit 250.

The position data acquiring unit 220 acquires information about the current position of the image capturing apparatus 100. The position data acquiring unit 220 has a plurality of functions of acquiring position information. In the embodiment, the position data acquiring unit 220 adopts both a method of acquiring position information from a GPS via the GPS antenna control unit 116, and a method of acquiring position information notified from a base station in a public network via the public network communication antenna control unit 114.

The time acquiring unit 230 acquires the current time measured by the timer unit 109. By using the movement detection unit 120 and timer unit 109, the moving amount measurement unit 240 measures a relative direction and distance in and by which the image capturing apparatus 100 has moved during a specific period. In the embodiment, the moving amount measurement unit 240 periodically monitors a measurement value obtained by the acceleration sensor and electronic compass, and calculates a moving direction and distance from a measured acceleration, azimuth, and monitoring period.

The position data analysis unit 250 analyzes the accuracy of position information acquired by the position data acquiring unit 220. The position information notification processing unit 260 notifies an external apparatus of information such as position data, position data accuracy information, and position data acquisition time. The position information notification processing unit 260 transmits data to the external apparatus using wireless LAN communication or public network communication.

An operation sequence in the image capturing apparatus 100 according to the embodiment will be explained with reference to the flowcharts of FIGS. 3A, 3B, and 4.

Figure 3A:
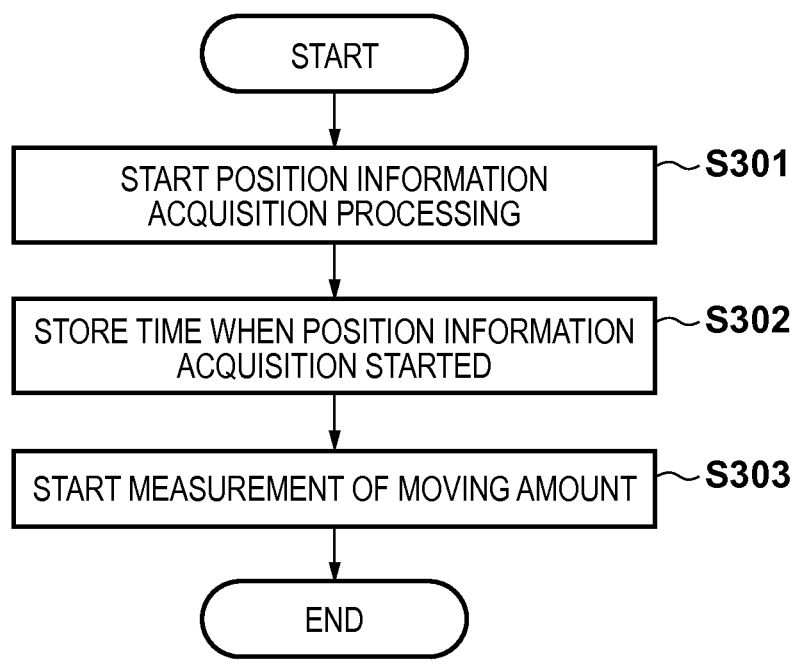
FIG. 3A is a flowchart showing an operation sequence at the start of position information acquisition processing in the image capturing apparatus.

The flowchart in FIG. 3A shows an operation sequence at the start of position information acquisition processing in the image capturing apparatus 100. The embodiment assumes that this processing is executed when the image capturing apparatus 100 is turned on, the user executes an operation to start the use of position information or executes an image capturing operation, or the image capturing apparatus 100 receives a message from an external apparatus.

In step S301, the position data acquiring unit 220 starts acquiring position information indicating the position of the image capturing apparatus 100. As described above, in the embodiment, the image capturing apparatus 100 has two functions, that is, a function of acquiring position information using a GPS, and a function of acquiring position information from a base station in public network communication. In step S301, the position data acquiring unit 220 captures a GPS satellite, and inquires position information of a base station. After performing step S301, the image capturing apparatus 100 performs processes in step S302 and subsequent steps without waiting for the completion of actually acquiring position information. An operation when position information is actually acquired will be described later with reference to FIG. 4.

In step S302, the time acquiring unit 230 acquires the time when position information acquisition processing started. In step S303, by using the movement detection unit 120 and timer unit 109, the moving amount measurement unit 240 measures a relative moving direction and moving distance (moving amount) in and by which the image capturing apparatus 100 has moved during a specific period. After that, the image capturing apparatus 100 periodically records a relative moving direction and moving amount from the current time.

An example of recorded moving amount data will be described in detail with reference to FIG. 5A. As moving amount data, the moving amount measurement unit 240 records a measurement date & time 601 when the moving amount measurement unit 240 executed measurement, and an east-west direction moving distance 603 and north-south direction moving distance 604 from a point where measurement of the moving amount has started in step S303. In the example of FIG. 5A, 2010-12-24 11:30:00 in record No. 1 is the date & time when measurement of the moving amount started. Record No. 2 and subsequent records represent east-west direction moving distances and north-south direction moving distances from the time when record No. 1 was recorded, that is, the time when measurement of the moving amount started. For example, record No. 4 represents that the image capturing apparatus 100 has moved by 2.25 m in the east and 0.5 m in the south at the time of 2010-12-24 11:30:40 after the start of measuring the moving amount.

After that, the process ends.

Figure 3B:
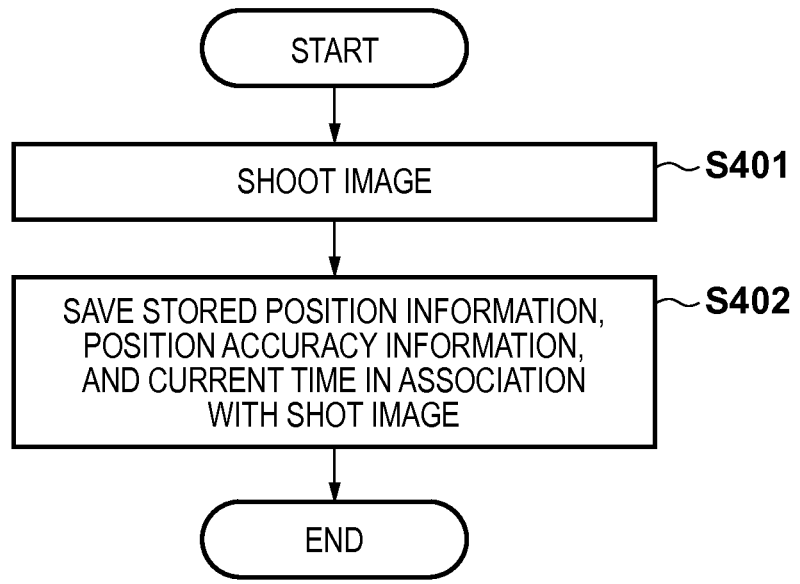
FIG. 3B is a flowchart showing an operation sequence when the image capturing apparatus performs image capturing processing.

The flowchart in FIG. 3B shows an operation sequence when the image capturing apparatus 100 performs image capturing processing.

In step S401, the image capturing unit 103 captures an image in accordance with a user operation, timer processing, or the like. In step S402, the captured image data storage unit 210 saves, in association with the captured image, position information, accuracy information of the position information, and the current time which are stored in the image capturing apparatus 100. More specifically, the captured image data storage unit 210 stores the position information, accuracy information, and current time in association with one captured image in the storage unit 107 formed from a nonvolatile memory. Thereafter, the process ends.

The format of data saved in association with a captured image in step S402 will be explained in detail with reference to FIG. 5B. The captured image data storage unit 210 saves an image ID 701 to be associated with image data, an image capturing date & time 702, position information 703 upon image capturing, and accuracy information 706 of the position information. The position information 703 is position information acquired by a GPS or position information acquired from a base station in public network communication. That is, the position information 703 is formed from the values of a latitude 704 and longitude 705. The accuracy information 706 of position information is information indicating the accuracy of position information, and is information for comparing accuracies. In the embodiment, the accuracy information is the radius of a position information error indicated in meters. However, in the present invention, the index value usable as accuracy information of position information is not limited to this. The index suffices to be able to compare the accuracies of pieces of position information 703. For example, the accuracy information may be information about the method used to acquire position information (for example, "position of a base station for a cellular phone", "position of a wireless LAN access point", "GPS (two-dimensional positioning)", or "GPS (three-dimensional positioning)").

An operation sequence when the image capturing apparatus 100 acquires position information will be explained with reference to the flowchart of FIG. 4.

In step S501, the position data acquiring unit 220 acquires information about the current position of the image capturing apparatus 100. The time acquiring unit 230 acquires the current time measured by the timer unit 109. The position data analysis unit 250 analyzes the accuracy of the position information acquired by the position data acquiring unit 220. The accuracy information of position information is the same index value as accuracy information saved in association with an image that has been described with reference to FIG. 5B. In the embodiment, the accuracy information is the radius of an error of acquired position information indicated in meters.

In step S502, the captured image data storage unit 210 stores the position information acquired by the position data acquiring unit 220, the image capturing time acquired by the time acquiring unit 230, and the position accuracy information acquired by the position data analysis unit 250 in association with each other.

In step S503, the control unit 110 determines whether the accuracy (second accuracy) of position information (second position information) currently acquired by the second acquisition processing is higher than the accuracy (first accuracy) of position information (first position information) acquired immediately previously by the first acquisition processing. If the control unit 110 determines that the accuracy of currently acquired position information is higher than that of immediately previously acquired position information (YES in step S503), the process advances to step S504. If the control unit 110 determines that the accuracy of currently acquired position information is equal to or lower than that of immediately previously acquired position information (NO in step S503), the process ends.

In steps S504 to S508, the control unit 110 performs update processing for position information which has been saved in association with an image captured in the past. More specifically, the image capturing apparatus 100 performs processes in steps S505 to S508 for each image captured in the past.

In step S505, the control unit 110 acquires position information stored in association with one of images captured in the past, and accuracy information of the position information.

In step S506, the control unit 110 performs position information update determination processing to determine, based on the currently acquired position information and accuracy information, whether to update position information associated with the image. Details of the processing to determine whether to update position information will be described with reference to the flowchart of FIG. 6.

In step S507, the control unit 110 determines, based on the result of position information update determination processing, whether to update the position information. If the control unit 110 determines to update the position information (YES in step S507), the process advances to step S508. If the control unit 110 determines not to update the position information (NO in step S507), the process advances to step S509.

In step S508, the control unit 110 updates the position information associated with the image and the position accuracy information to the position information and position accuracy information which have been acquired in step S501. More specifically, the control unit 110 rewrites, by the position information and position accuracy information which have been acquired in step S501, the position information and position accuracy information which have already been stored in the storage unit 107 in association with the image. Hence, while suppressing the amount of information stored in association with the image, higher-accuracy position information can be associated with the image. However, the present invention is not limited to this. The control unit 110 may write the position information and position accuracy information which have been acquired in step S501, in addition to the position information and position accuracy information which have already been stored in the storage unit 107 in association with the image.

In step S509, the control unit 110 determines whether all images captured in the past have been searched. If the control unit 110 determines that all images have been searched (YES in step S509), the process ends. If the control unit 110 determines that not all images have been searched (NO in step S509), the process is looped from step S504.

Details of the processing in step S506 to determine whether to update position information saved in association with an image will be described with reference to the flowchart of FIG. 6.

In step S801, the control unit 110 compares the accuracy of position information acquired in step S501 with an accuracy which has already been stored in association with the image.

In step S802, the control unit 110 determines whether the accuracy of position information acquired in step S501 is higher than that of position information which has already been stored in association with the image. If the control unit 110 determines that the accuracy of acquired position information is higher than that of already-stored position information, the process advances to step S803. If the control unit 110 determines that the accuracy of acquired position information is equal to or lower than that of already-stored position information, the process advances to step S810.

In step S803, the control unit 110 compares the shooting time of the image with the start time of moving amount measurement which has started in step S303 (step S803).

In step S804, the control unit 110 determines whether the shooting time of the image is later than the start time of moving amount measurement which has started in step S303. If the control unit 110 determines that the shooting time is later than the start time (YES in step S804), the process advances to step S805. If the control unit 110 determines that the shooting time is not later than the start time (NO in step S804), the process advances to step S810. More specifically, when the second position information is acquired within a predetermined time after image capturing, the first position information associated with image data is updated to the second position information.

In step S805, the control unit 110 calculates a moving amount from the shooting time to the current time. The moving amount is calculated using moving amount measurement data exemplified in FIG. 5A. For example, when the shooting time is 11:31:00 and the current time is 11:32:00, a value obtained by subtracting the value in record No. 5 shown in FIG. 5A from that in record No. 8 serves as a moving amount from the shooting time to the current time. That is, the image capturing apparatus 100 has moved by 0.75 m (3.25-2.5) in the east and 1.75 m (-2.25-(-0.5)) in the south.

In step S806, the control unit 110 calculates position information upon shooting based on the moving amount calculated in step S805. That is, the control unit 110 calculates, based on the position information acquired in step S501, a position to which the image capturing apparatus 100 moves in an opposite direction by the moving amount calculated in step S805. In the above example, the latitude and longitude of a point to which the image capturing apparatus 100 moves from the position acquired in step S501 by 0.75 m in the west and 1.75 m in the north.

In step S807, the control unit 110 compares the position upon shooting that has been calculated in step S806, with the position which has been stored in association with the image. In step S808, the control unit 110 determines whether the position upon shooting falls within the error range of the position which has been stored in association with the image. For example, when the image is "IMG_0002" shown in FIG. 5B, the control unit 110 determines whether the position upon shooting that has been calculated in step S806 falls within a radius of 1,000 m from a point at latitude 35.680374° and longitude 139.769550°. If the control unit 110 determines that the position upon shooting falls within the error range of the position which has been stored in association with the image (YES in step S808), the process advances to step S809. If the control unit 110 determines that the position upon shooting does not fall within the error range of the position which has been stored in association with the image (NO in step S808), the process advances to step S810.

In step S809, the control unit 110 updates the position information of the image to the position information upon shooting that has been calculated in step S806. The control unit 110 also updates accuracy information of the position information that has been stored in association with the image, to accuracy information of the position information that has been acquired in step S501. The process then ends. In step S810, the control unit 110 ends the process without updating the position information.

According to the embodiment, the image capturing apparatus which stores position information in association with a shot image can modify position information of an image shot in the past into higher-accuracy position information. For example, even for an image shot in a state in which a GPS satellite has not captured the position, high-accuracy position information measured using the GPS can be saved in association with the image.

Note that the method of determining in step S506 whether to update position information is not limited to the processing of FIG. 6 described in the embodiment.

In the embodiment, update processing (steps S504 to S508) for position information saved in association with a shot image is performed when position information is acquired. However, the present invention is not limited to this. For example, the latest stored position information may be checked at a predetermined interval, and when accuracy information of the position information has changed, position information update processing may be executed. Position information update processing may also be synchronized with a user operation or image capturing operation.

The following condition is conceivable to update position information. Only image data for which it is determined that the image capturing apparatus has not moved (by a predetermined amount or more) until higher-accuracy position information is acquired after shooting may be updated. More specifically, position information stored until the moving amount of the image capturing apparatus becomes measurable after acquiring higher-accuracy position information, and the accuracy of the position information may be updated. The moving amount may become measurable at the start time of moving amount measurement. Position information may be updated for only images shot within a predetermined time. Position information may be updated for only images whose position information acquired at higher accuracy falls within the error range of position information upon shooting. Position information may be updated only when the relative moving amount until higher-accuracy information is acquired after shooting can be calculated. Position information data to be updated may be overwritten directly by newly acquired high-accuracy position information, or a value corrected by relative position information (moving information) after shooting.

"High-accuracy" position information may be determined based on whether the position information has been obtained by a GPS or radio waves from a base station (GPS>base station). The determination may be made based on the GPS positioning method (two-dimensional positioning<three-dimensional positioning). When there are a plurality of devices having the position information acquiring function (for example, even a camera has the GPS function in cooperation between the camera and a cellular phone), the accuracy may be determined based on a device which has acquired position information (cellular phone<camera).

As target position information to be updated, position information and accuracy which have been stored a predetermined time after the position information was acquired may be updated. The predetermined time after the past may be the time when the image capturing apparatus started acquisition of position information, the time when position information was acquired at almost the same accuracy as the previous one, or another fixed/set time.

Second Embodiment

The first embodiment has explained the present invention using a device example in which the image capturing apparatus is a camera-equipped cellular phone and has both the image capturing function and position information acquiring function. However, in the present invention, a device having the image capturing function and a device having the position information acquiring function may be separate devices. An example in which the image capturing apparatus is a digital camera, the position information acquiring apparatus is a cellular phone, and the present invention is practiced by wireless communication between the digital camera and the cellular phone will be described. Assume that the positions of the digital camera and cellular phone can be handled as almost the same position. In other words, position information of the cellular phone is usable as that of the digital camera.

Figure 2:
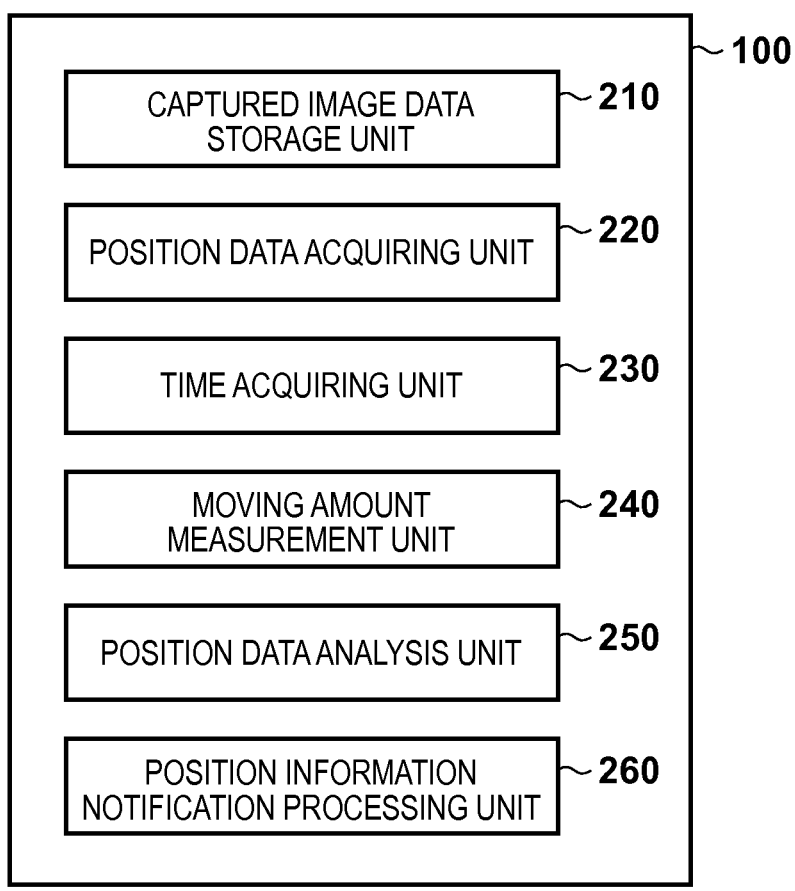
FIG. 2 is a block diagram exemplifying the functional block arrangement of the image capturing apparatus.

The hardware arrangement and functional blocks of an image capturing apparatus 100 (for example, cellular phone 100) in the second embodiment are the same as those in FIGS. 1 and 2 described in the first embodiment, and a description thereof will not be repeated.

Figure 7:
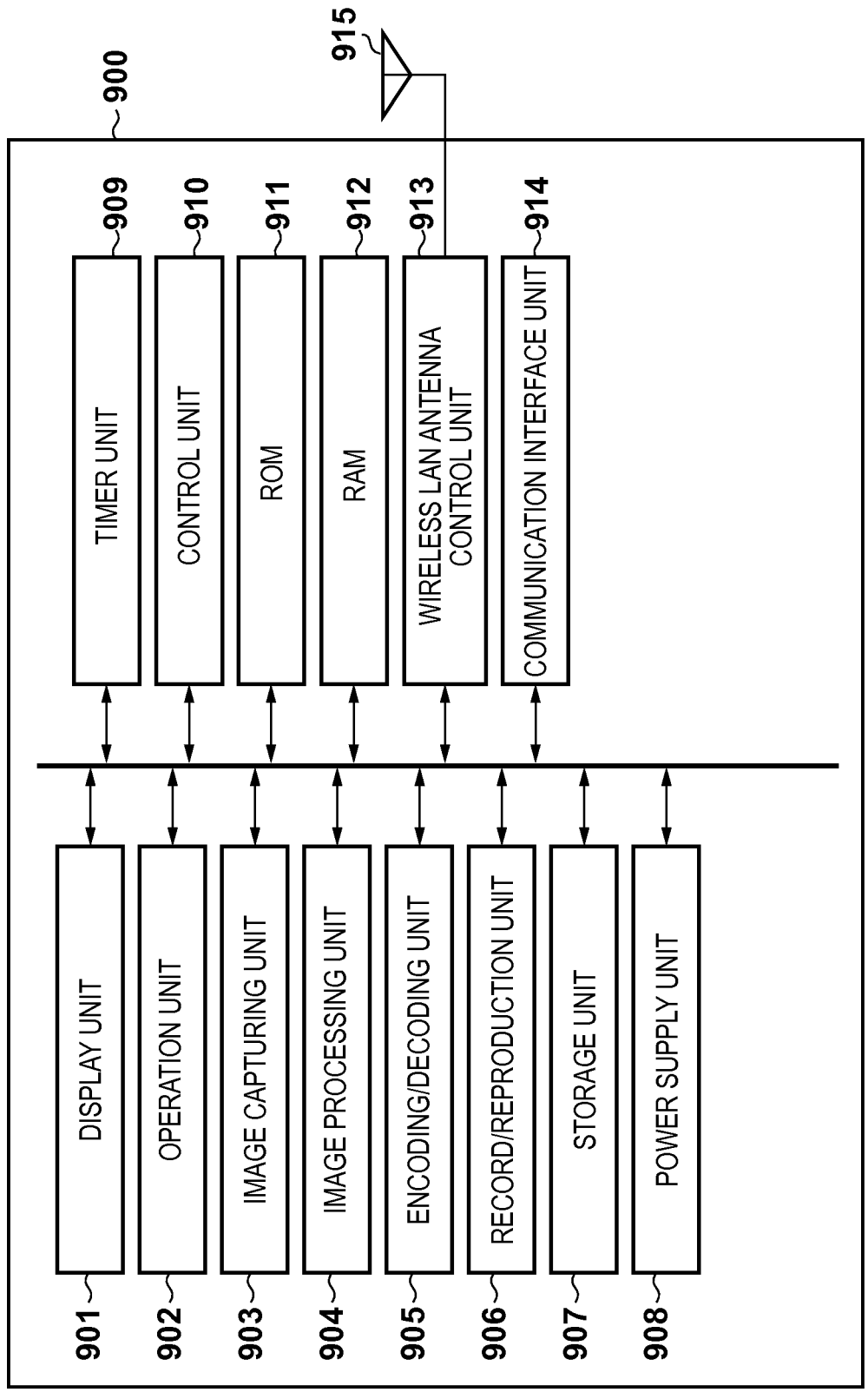
FIG. 7 is a block diagram exemplifying the hardware arrangement of an image capturing apparatus according to the second embodiment.

FIG. 7 is a block diagram showing the hardware arrangement of an image capturing apparatus 900 (for example, digital camera) which practices the present invention. The digital camera 900 includes a display unit 901, operation unit 902, image capturing unit 903, image processing unit 904, encoding/decoding unit 905, record/reproduction unit 906, storage unit 907, power supply unit 908, timer unit 909, control unit 910, ROM 911, RAM 912, wireless LAN antenna control unit 913, communication interface 914, and wireless LAN antenna 915.

The display unit 901 and operation unit 902 perform display and execution of an application, and the like. The image capturing unit 903 captures an optical image of an object. The image processing unit 904 converts an image captured by the image capturing unit 903 into image data of a predetermined format, and adds watermark data to the image data.

The encoding/decoding unit 905 performs predetermined high-efficiency encoding (for example, DCT transform and variable-length encoding after quantization) for the image data output from the image processing unit 904. The encoding/decoding unit 905 also decompression-decodes compressed image data reproduced by the record/reproduction unit 906, and supplies the image data to the image processing unit 904.

The record/reproduction unit 906 records compression-encoded image data on a recording medium (not shown), and reproduces it. A communication device in the embodiment compression-encodes image data using, for example, the JPEG (Joint Photographic Experts Group) as a technique of encoding image data. The storage unit 907 stores and manages various data such as wireless communication network information, data transmission/reception information, communication device information, and shot image information. The power supply unit 908 is, for example, a battery.

The timer unit 909 functions as a timer which measures time. The control unit 910 is, for example, a CPU, and controls the operations of the respective building components of the digital camera 900. The ROM 911 stores control instructions, that is, programs. The RAM 912 is used as a work memory and an area for temporarily saving data when executing a program. The wireless LAN antenna control unit 913 controls the wireless LAN antenna 915. The communication interface unit 914 (to be also referred to as a "communication I/F") is an interface for performing communication processing including network search, construction, connection, and management.

Figure 8:
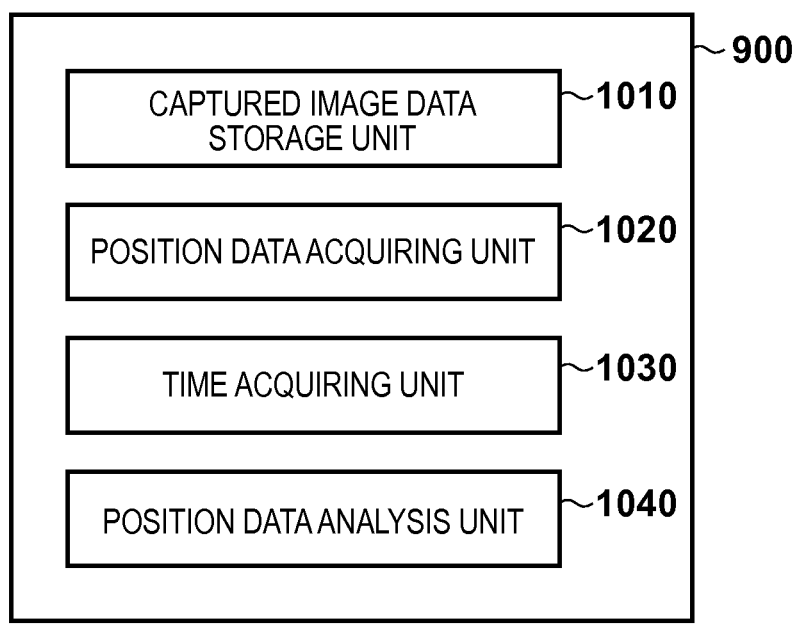
FIG. 8 is a block diagram exemplifying the functional block arrangement of the image capturing apparatus according to the second embodiment.

The functional blocks of the digital camera 900 will be explained with reference to FIG. 8. In the embodiment, the functional blocks of the digital camera 900 are stored as programs in the ROM 911. These functions are implemented by executing the programs by the control unit 910. Note that some or all of the functional blocks of the digital camera 900 may be implemented by hardware components.

The digital camera 900 includes a captured image data storage unit 1010, position data acquiring unit 1020, time acquiring unit 1030, and position data analysis unit 1040. The captured image data storage unit 1010 stores and manages image data, and metadata associated with the image data. The captured image data storage unit 1010 stores and manages, in association with each other, image data captured by the image capturing unit 903, position information acquired by the position data acquiring unit 1020, image capturing time acquired by the time acquiring unit 1030, and position accuracy information acquired by the position data analysis unit 1040.

The position data acquiring unit 1020 acquires information about the current position of the digital camera 900. In the embodiment, the position data acquiring unit 1020 acquires position information from the connected cellular phone 100 via the wireless LAN antenna control unit 913. The time acquiring unit 1030 acquires the current time measured by the timer unit 909. The position data analysis unit 1040 analyzes the accuracy of position information acquired by the position data acquiring unit 1020.

Figure 9:
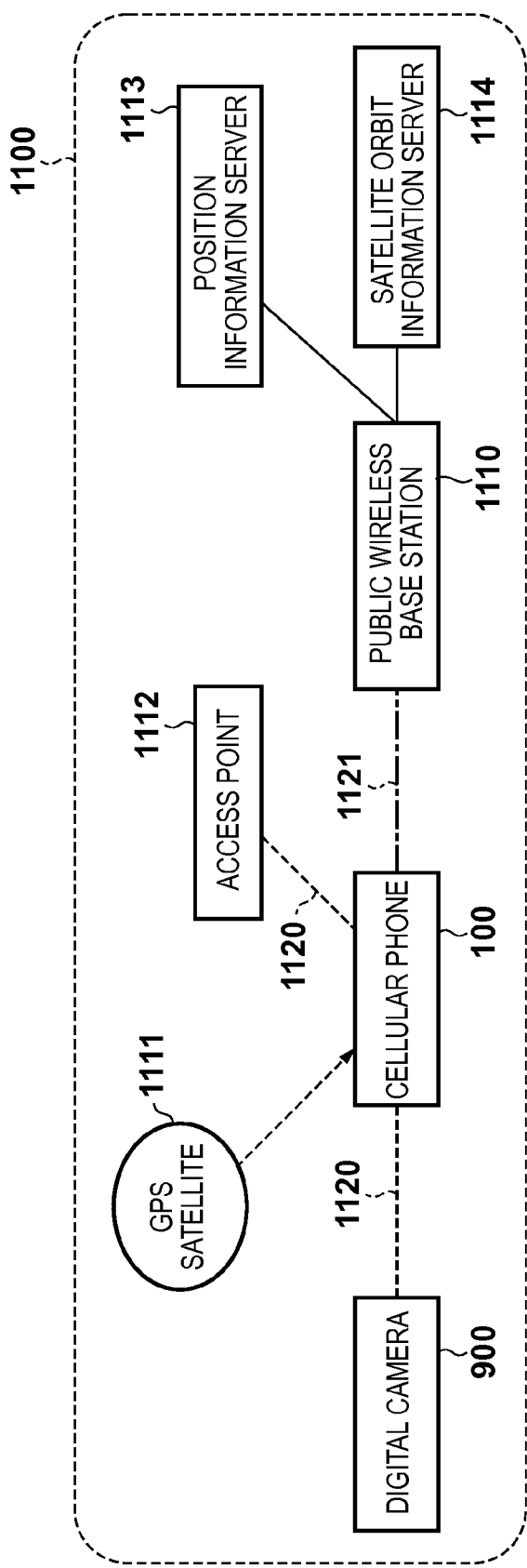
FIG. 9 is a block diagram showing a system arrangement in the second embodiment.

An image capturing system according to the embodiment will be exemplified with reference to FIG. 9. An image capturing system 1100 includes the cellular phone 100 and digital camera 900. Processing in the embodiment uses a public wireless base station 1110, GPS satellite 1111, access point 1112, position information server 1113, and satellite orbit information server 1114 shown in FIG. 9. The cellular phone 100 and digital camera 900 communicate with each other by wireless LAN communication 1120. The cellular phone 100 performs public network wireless communication 1121 with the public wireless base station 1110. The cellular phone 100 can detect the nearby access point 1112 by the wireless LAN communication 1120. The cellular phone 100 can receive radio waves from the GPS satellite 1111.

The public wireless base station 1110 and access point 1112 are connected to the position information server 1113 and satellite orbit information server 1114. The position information server 1113 holds the installation positions of the public wireless base station 1110 and access point 1112, and notifies the cellular phone 100 of them. The satellite orbit information server 1114 provides GPS satellite orbit information to the cellular phone 100. The cellular phone 100 can connect to the position information server 1113 and satellite orbit information server 1114 via the public wireless base station 1110 or access point 1112.

Figure 10:
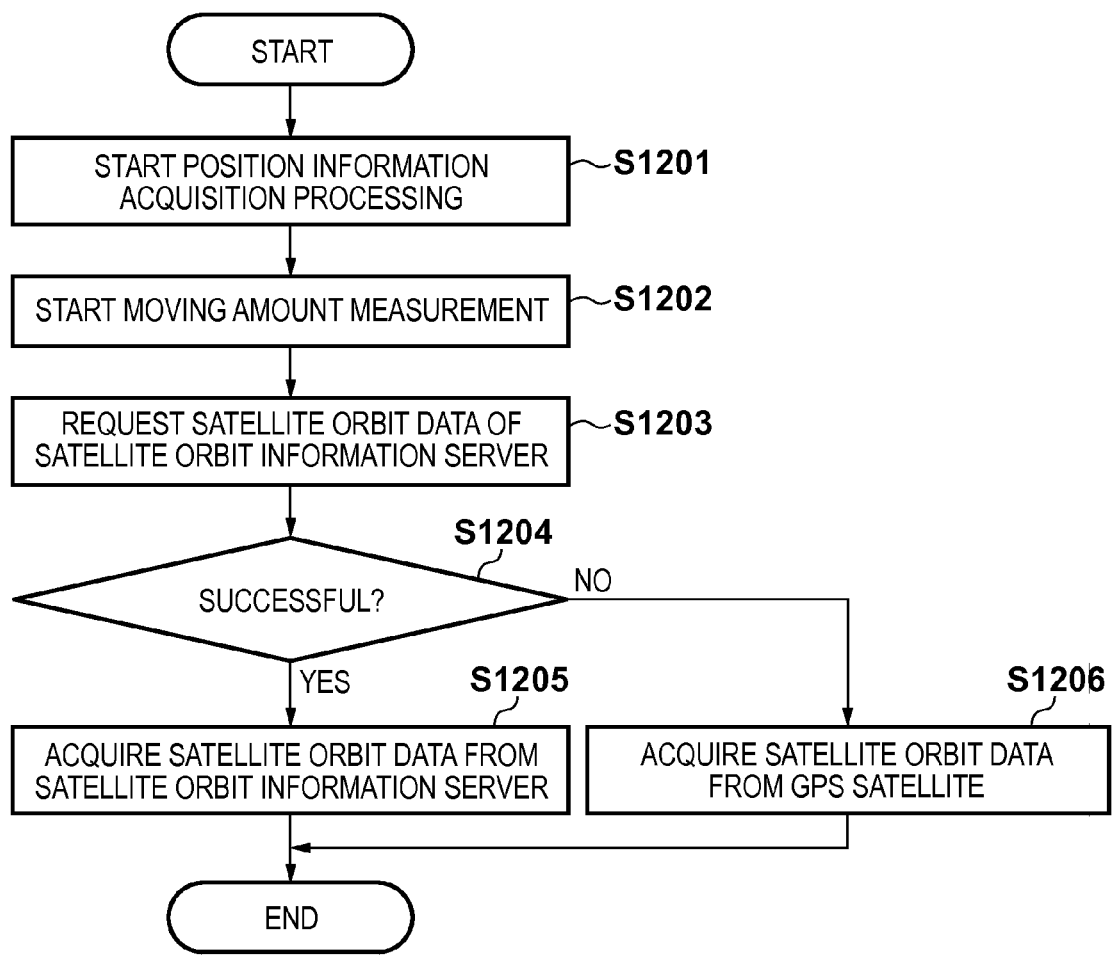
FIG. 10 is a flowchart showing an operation sequence by the image capturing apparatus in the second embodiment.

An operation sequence in the cellular phone 100 according to the embodiment will be explained with reference to FIGS. 10 to 12. FIG. 10 is a flowchart showing an operation sequence at the start of position information acquisition processing in the cellular phone 100. The embodiment assumes that this processing is executed when the cellular phone 100 is turned on, the user executes an operation to start the use of position information, or the cellular phone 100 receives a message from an external apparatus.

In step S1201, a position data acquiring unit 220 starts position information acquisition processing. After that, the cellular phone 100 periodically executes position information acquisition processing shown in the flowchart of FIG. 11, and stores the current position information.

In step S1202, a moving amount measurement unit 240 periodically measures and records a relative moving direction and moving amount from the current time. The moving amount data recorded here is the same as that in the example of FIG. 5A described in detail in the first embodiment, and a description thereof will not be repeated.

In steps S1203 to S1206, the cellular phone 100 acquires GPS satellite orbit information in order to measure the current position using a GPS. First, in step S1203, the cellular phone 100 requests satellite orbit data of the satellite orbit information server 1114.

Then, in step S1204, the cellular phone 100 determines whether the satellite orbit data request to the satellite orbit information server 1114 has succeeded.

If the cellular phone 100 determines that the satellite orbit data request has succeeded (YES in step S1204), the process advances to step S1205. If the cellular phone 100 determines that the satellite orbit data request has failed (NO in step S1204), the process advances to step S1206.

In step S1205, the cellular phone 100 acquires satellite orbit data from the satellite orbit information server 1114, and performs positioning by the GPS using this data. In step S1206, the cellular phone 100 acquires satellite orbit data originated from the GPS satellite 1111. This processing generally takes several min. For this reason, the request to the satellite orbit information server 1114 in step S1203 may be repeated until, for example, satellite orbit data is acquired from the GPS satellite 1111. After that, the processing in FIG. 10 ends.

Figure 11:
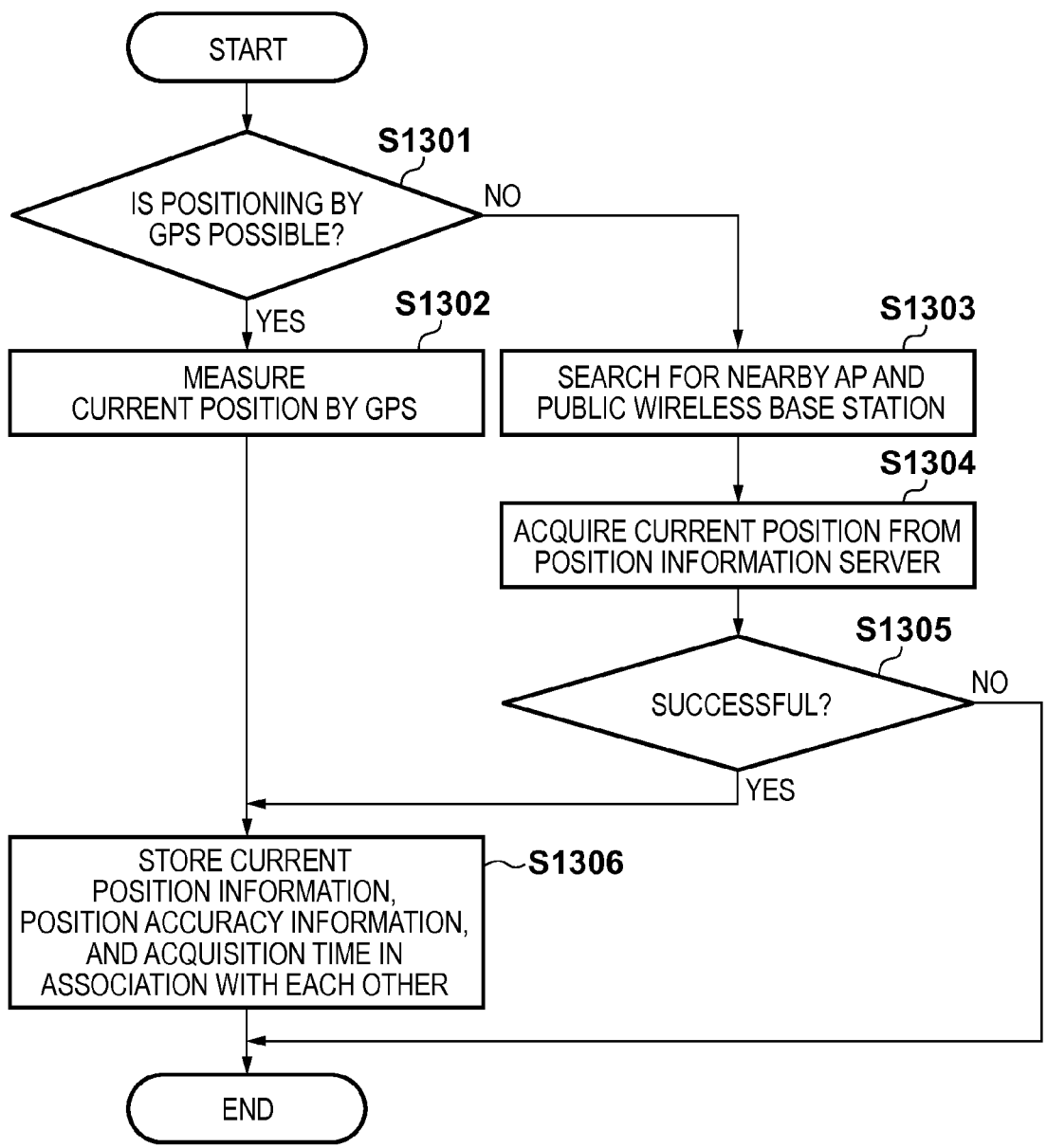
FIG. 11 is a flowchart showing an operation sequence by the image capturing apparatus in the second embodiment.

FIG. 11 is a flowchart showing an operation sequence when the cellular phone 100 actually measures the current position.

In step S1301, the cellular phone 100 determines whether positioning using a GPS is possible when measuring the current position. More specifically, the cellular phone 100 determines whether positioning using a GPS is possible, based on a condition such as whether satellite orbit data has been acquired in step S1205 or S1206 of FIG. 10 or whether radio waves can be received now from the GPS satellite 1111. If the cellular phone 100 determines that positioning using a GPS is possible (YES in step S1301), the process advances to step S1302. If the cellular phone 100 determines that positioning using a GPS is impossible (NO in step S1301), the process advances to step S1303.

In step S1302, the cellular phone 100 measures the current position using the GPS. In step S1303, the cellular phone 100 searches for a nearby access point and public wireless base station, and collects their identifiers. In step S1304, the cellular phone 100 notifies the position information server 1113 of the identifiers of the access point and public wireless base station that have been collected in step S1303, and acquires the current position from the position information server 1113.

In step S1305, the cellular phone 100 determines whether acquisition of the current position from the position information server 1113 has succeeded. If the cellular phone 100 determines that acquisition of the current position has succeeded (YES in step S1305), the process advances to step S1306. If the cellular phone 100 determines that acquisition of the current position has failed (NO in step S1305), the process ends.

In step S1306, the cellular phone 100 stores the measured current position, the accuracy of the current position information, and the current time in association with each other (step S1306). The process then ends. An example of position information data stored in step S1306 will be explained with reference to FIG. 15. The cellular phone 100 stores a positioning date & time 1701, measured position information 1702, and accuracy information 1705 of the position information. The position information 1702 is formed from the values of a latitude 1703 and longitude 1704 acquired from the GPS satellite 1111 or position information server 1113. The accuracy information 1705 of position information is information indicating the accuracy of position information, and is information for comparing accuracies. In the embodiment, the accuracy information is the radius of a position information error indicated in meters. However, in the present invention, the index value used as accuracy information of position information is not limited to this. The index suffices to be able to compare the accuracies of pieces of position information 1702. For example, the accuracy information may be the method used to acquire position information (for example, "position of a base station for a cellular phone", "position of a wireless LAN access point", "GPS (two-dimensional positioning)", or "GPS (three-dimensional positioning)").

The embodiment assumes that the processing shown in FIG. 11 is periodically executed every predetermined time after the start of position information acquisition processing in step S1201. However, the present invention is not limited to this. For example, the processing shown in FIG. 11 may be executed when the cellular phone 100 detects that it has moved, by using an acceleration sensor or the like.

Figure 12:
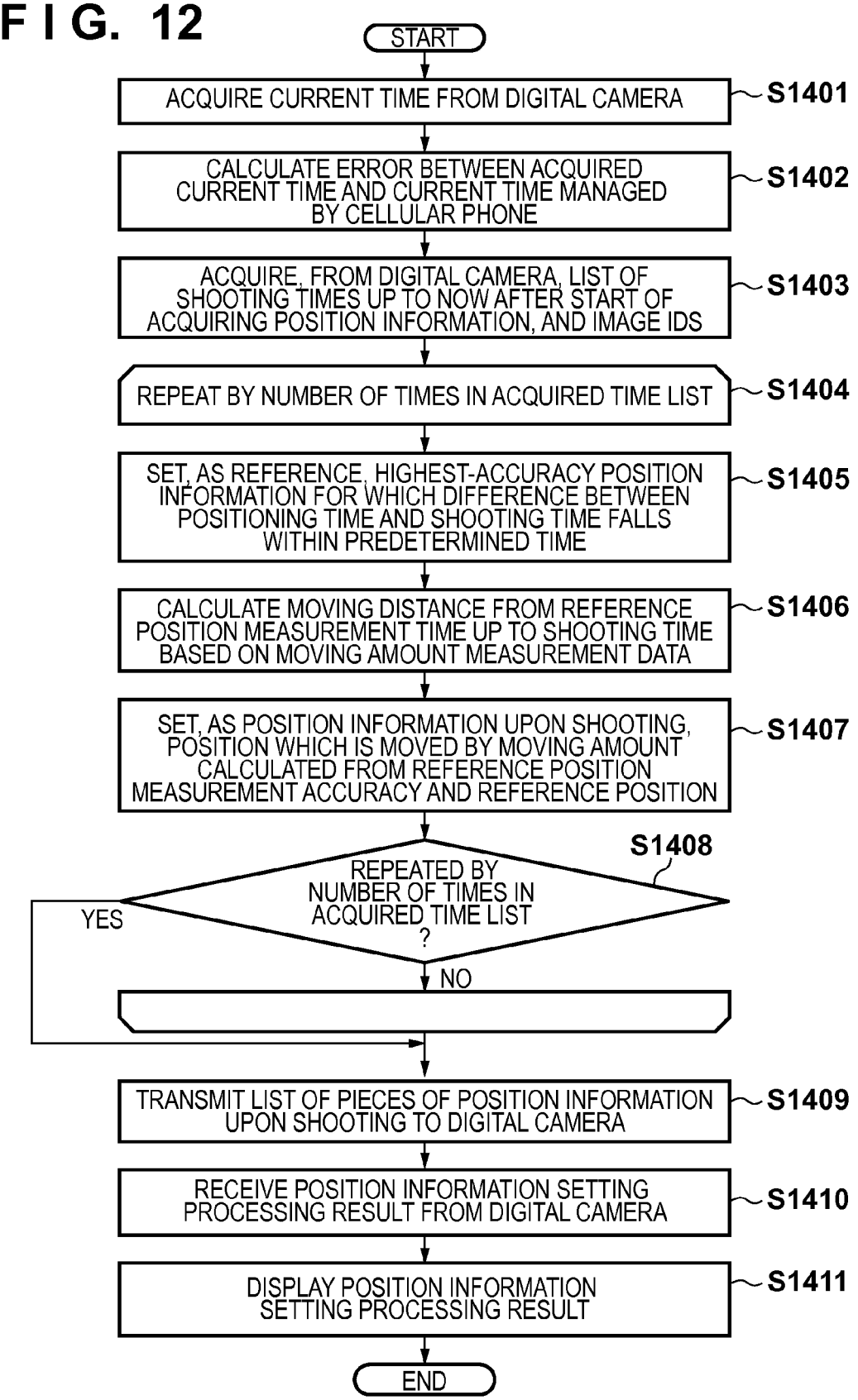
FIG. 12 is a flowchart showing an operation sequence by a position information acquiring apparatus in the second embodiment.

FIG. 12 is a flowchart showing an operation sequence when the cellular phone 100 (cellular phone) notifies the digital camera 900 of position information. In the embodiment, this processing is executed in response to a menu operation by the user. Depending on an implementation of the present invention, the processing may be executed by a periodical operation based on timer processing, a notification from an external apparatus, or the like.

In step S1401, when notifying the digital camera 900 of position information, the cellular phone 100 acquires the current time from the digital camera 900. The current time to be acquired is the current time acquired by the digital camera 900 from the time acquiring unit 1030.

In step S1402, the cellular phone 100 acquires the current time using a time acquiring unit 230 of the cellular phone 100, and calculates a difference between the time of the digital camera 900 and that of the cellular phone 100. Time information corrected by the error calculated in step S1402 is transmitted/received in the case that the cellular phone 100 exchanges time information with the digital camera 900 in the subsequent processes of steps S1403 to S1408.

In step S1403, the cellular phone 100 notifies the digital camera 900 of the time when acquisition of position information started (time when processing in step S1201 was executed) and the current time. Further, the cellular phone 100 acquires, from the digital camera 900, a list of times when images were shot at this time interval, and the identifiers of the shot images. As described above, the time of which the cellular phone 100 notifies the digital camera 900 is a value obtained by correcting the time managed inside the cellular phone 100 by the time error calculated in step S1402.

If the cellular phone 100 has acquired the list in step S1403, it calculates position information at each acquired shooting time using moving amount information shown in FIG. 5A and position information shown in FIG. 15 in steps S1404 to S1407. The cellular phone 100 performs processes in steps S1405 to S1407 for each element in the acquired shooting time list.

In step S1405, the cellular phone 100 selects, from the position information list stored in step S1306, a record in which the difference between the positioning time 1701 and the shooting time falls within a predetermined time and the accuracy 1705 is highest. The cellular phone 100 sets position information of this record as a reference position.

In step S1406, the cellular phone 100 calculates a moving direction and distance from the positioning time of the reference position up to the shooting time by referring to the moving amount information exemplified in FIG. 5A. In step S1407, the cellular phone 100 sets, as a shooting position, a point which is moved from the reference position set in step S1405 by the distance in the moving direction that have been calculated in step S1406.

In step S1408, the cellular phone 100 determines whether the process has been repeated by the number of times in the acquired time list. If the cellular phone 100 determines that the process has been repeated by the number of times in the acquired time list (YES in step S1408), the process advances to step S1409. If the cellular phone 100 determines that the process has not been repeated by the number of times in the acquired time list (NO in step S1408), the process is looped from step S1404.

In step S1409, the cellular phone 100 transmits the identifier of an image, corresponding position information, and the accuracy of the position information to the digital camera 900. In the embodiment, the accuracy information transmitted to the digital camera 900 is the value of the accuracy 1705 in the position information list data set as a reference in step S1405. However, the present invention is not limited to this. For example, correction processing may be performed to modify the accuracy in accordance with the length of time from the positioning time of the reference position selected in step S1405 up to the shooting time.

In step S1410, the cellular phone 100 receives the processing result of position information setting processing in the digital camera 900. In the embodiment, the processing result received in step S1410 is the number of images for which setting of position information has failed in the digital camera 900. In step S1411, the cellular phone 100 displays the processing result received in step S1410 on the display unit 101 to notify the user of it. In the embodiment, if the setting failure image count received in step S1410 is 0, the cellular phone 100 displays a character string representing that position information setting processing has succeeded, and if the setting failure image count is equal to or larger than 1, displays a character string representing that position information setting processing has failed. After that, the processing in FIG. 12 ends.

An operation sequence when the digital camera 900 saves position information in association with a shot image will be explained with reference to the flowchart of FIG. 13. In the embodiment, this processing is executed when the digital camera 900 receives the position information list transmitted from the cellular phone 100 in step S1408. In FIG. 13, the digital camera 900 executes position information addition/update processing for all images corresponding to image identifiers contained in the position information list received from the cellular phone 100.

In step S1502, the digital camera 900 compares the accuracy of position information designated in the received position information list with that of position information which is designated in the position information list and stored in association with an image. An image for which no corresponding position information is stored is handled as an image having a lowest position information accuracy.

In step S1503, the digital camera 900 determines whether the accuracy (second accuracy) of the position information (second position information) in the position information list is higher than the accuracy (first accuracy) of the position information (first position information) which is designated in the position information list and stored in association with the image. If the digital camera 900 determines that the accuracy of the position information in the position information list is higher than the accuracy of the stored position information (YES in step S1503), the process advances to step S1504. If the digital camera 900 determines that the accuracy of the position information in the position information list is equal to or lower than the accuracy of the stored position information (NO in step S1503), the process advances to step S1505 without updating the position information.

In step S1504, the digital camera 900 saves the position information designated in the position information list in association with the image. If there is position information which has already been stored in association with the image, the position information is overwritten by information in the received position information list.

In step S1505, the digital camera 900 determines whether the process has been repeated by the number of pieces of position information in the received position information list. If the digital camera 900 determines that the process has been repeated by the number of pieces of position information in the position information list (YES in step S1505), the process advances to step S1506. If the digital camera 900 determines that the process has not been repeated by the number of pieces of position information in the position information list (NO in step S1505), the process is looped from step S1501.

In step S1506, the digital camera 900 notifies the cellular phone 100 of the result of position information setting processing performed in steps S1501 to S1505. In the embodiment, the position information setting processing result notified in step S1506 is the number of images for which save of position information has failed in step S1504. After that, the processing in FIG. 13 ends.

Figure 14A:
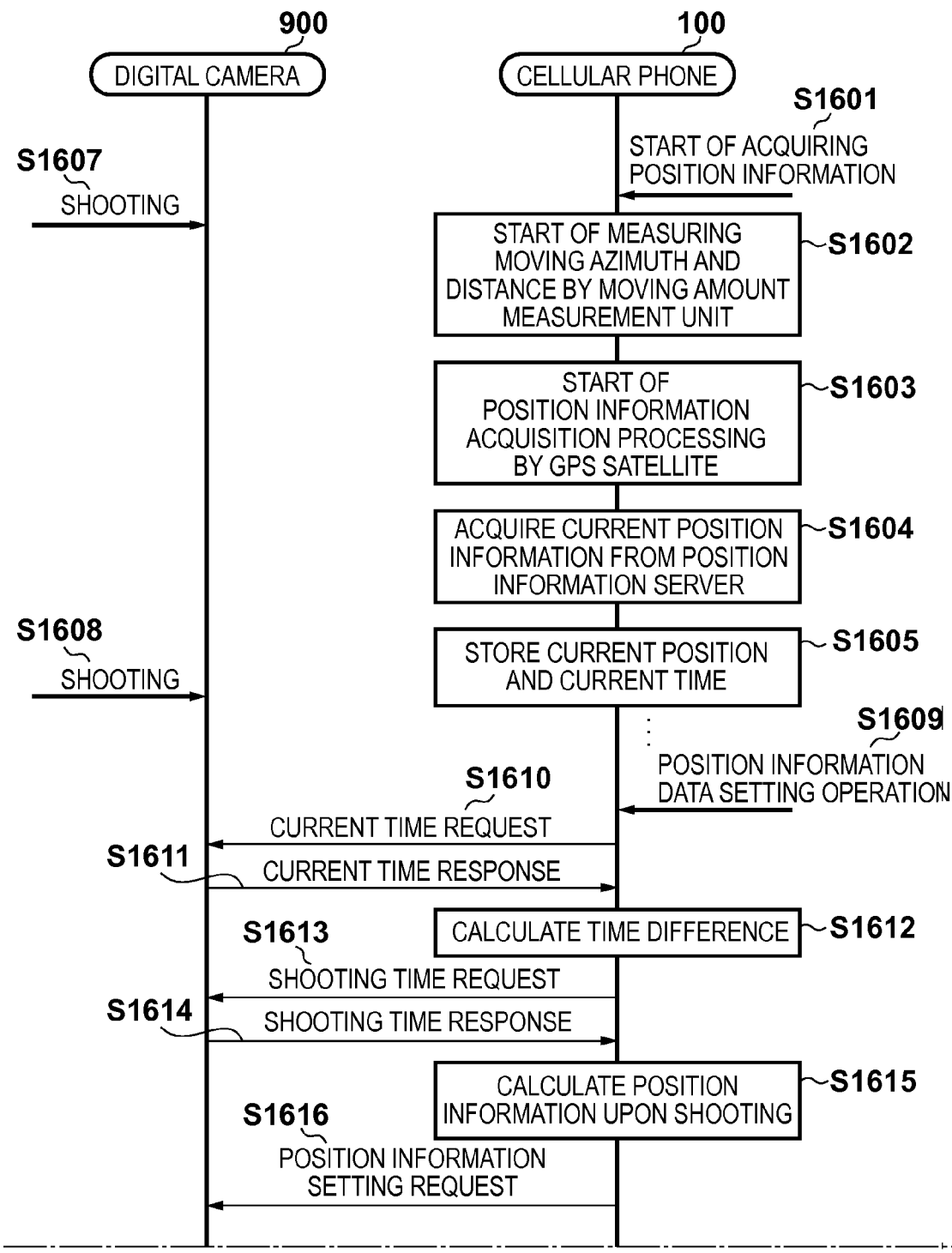
FIGS. 14A and 14B are sequence charts exemplifying an operation in the second embodiment.
Figure 14B:
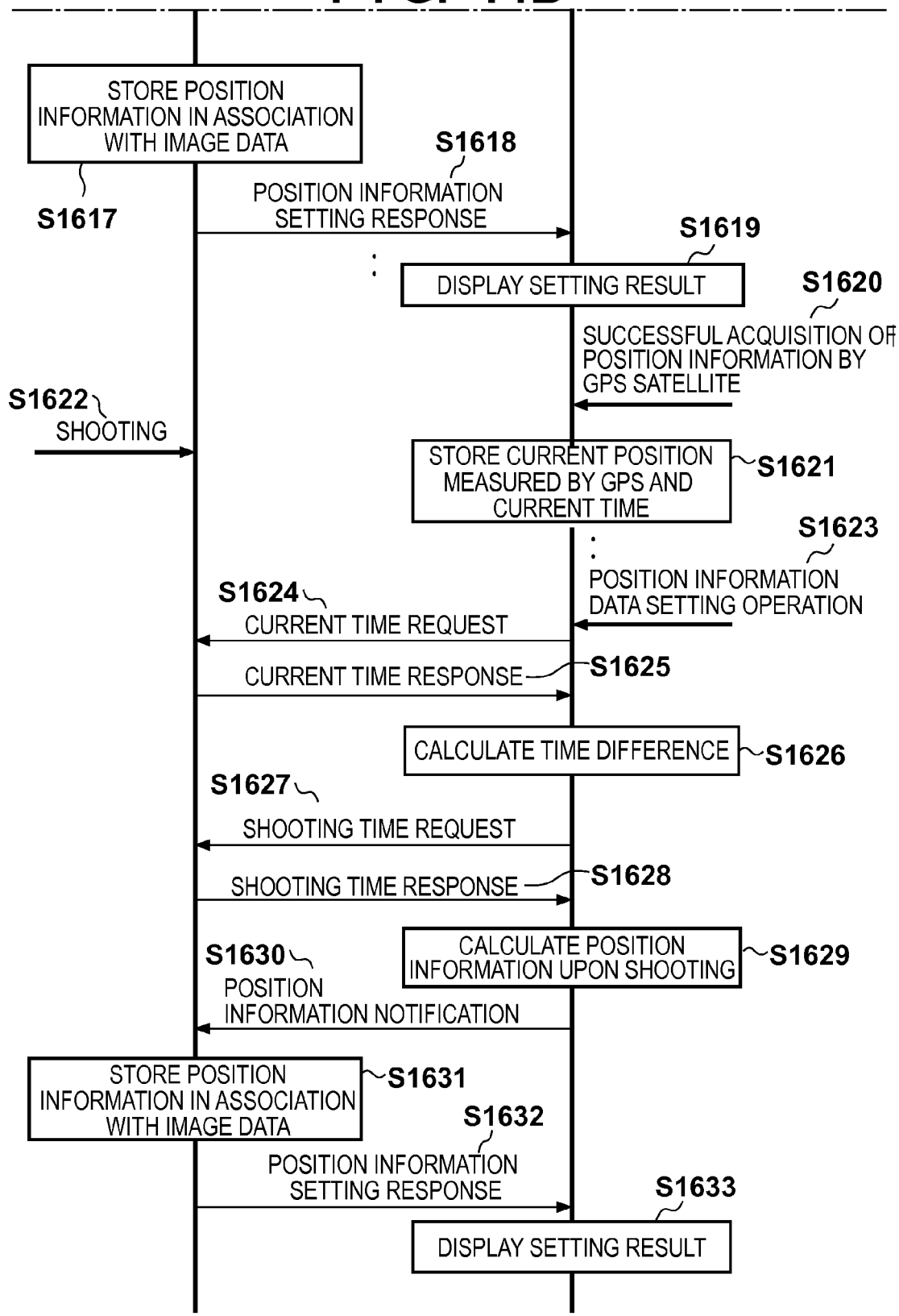

A communication sequence between the digital camera 900 and the cellular phone 100 (cellular phone) described with reference to FIGS. 7 to 13 will be exemplified in detail with reference to FIGS. 14A and 14B.

An initial state assumes that the digital camera 900 and cellular phone 100 have already been connected via a wireless LAN.

First, the user performs an operation in the cellular phone 100 to start acquiring position information (step S1601). After this operation, the cellular phone 100 starts measurement of a moving azimuth and distance by the moving amount measurement unit 240 (step S1602), and position information acquisition processing by the GPS (step S1603). At the time of step S1603, positioning by the GPS has not been completed yet. Then, the cellular phone 100 acquires current position information from the position information server 1113 (step S1604), and stores the acquired current position and current time in association with each other (step S1605). Subsequently, the cellular phone 100 periodically repeats the processes in steps S1604 and S1605.

On the other hand, the digital camera 900 performs shooting asynchronously from the processes in steps S1601 to S1605 (steps S1607 and S1608). In each shooting operation, the digital camera 900 stores the shooting time in association with the shot image data.

If a user operation is performed in the cellular phone 100 to transmit position information data to the digital camera 900 (step S1609), the cellular phone 100 requests the current time of the digital camera 900 (step S1610). Upon receiving the current time request (step S1610), the digital camera 900 sends back the current time managed by it as a response to the cellular phone 100 (step S1611). After acquiring the current time from the digital camera 900 (step S1611), the cellular phone 100 calculates a difference between the acquired current time and the current time managed by the cellular phone 100 (step S1612). Then, the cellular phone 100 requests a list of the identifiers and shooting times of images which have been shot until now after the start of acquiring position information (step S1601) (step S1613). In response to this request, the digital camera 900 sends back a list of image identifiers and shooting times to the cellular phone 100 (step S1614). Upon receiving this, the cellular phone 100 calculates position information upon shooting based on the position information stored in step S1605, and the moving azimuth and distance which have been measured from step S1602 (step S1615). Upon completion of calculating pieces of position information at all shooting times received in step S1614, the cellular phone 100 transmits position information corresponding to each shooting time and accuracy information of the position to the digital camera 900 (step S1616). At this time, the cellular phone 100 has not executed positioning by the GPS. Thus, the accuracy of position information transmitted to the digital camera 900 is an accuracy corresponding to position information acquired from the position information server 1113. In this example, "within a radius of 1,000 m" is set. Upon receiving the position information list (step S1616), the digital camera 900 stores position information (latitude and longitude) and accuracy information (within a radius of 1,000 m) in association with each corresponding image data (step S1617). In this case, the digital camera 900 stores position information at each time in association with an image shot in step S1607 or S1608.

Upon completion of processing in step S1617, the digital camera 900 notifies the cellular phone 100 of the result of processing in step S1617 (step S1618). The cellular phone 100 displays the processing result received in step S1618 as the result of position information data setting processing which has started in step S1609 (step S1619).

If the cellular phone 100 successfully acquires position information by the GPS (step S1620), it stores the current position measured by the GPS and the current time in association with each other (step S1621). Thereafter, the cellular phone 100 periodically repeats positioning by the GPS and storage of the positioning result.

If a user operation is performed in the cellular phone 100 to transmit position information data again to the digital camera 900 (step S1623), the cellular phone 100 performs the same processes as those in steps S1610 to S1614 (steps S1624 to S1628). Similar to step S1615, the cellular phone 100 then calculates position information upon shooting (step S1629). At this time, positioning by the GPS has succeeded (step S1620), and the cellular phone 100 calculates position information upon shooting based on the GPS positioning result. Upon completion of calculating position information upon shooting, the cellular phone 100 transmits position information corresponding to each shooting time and accuracy information of the position to the digital camera 900 (step S1630). At this time, the cellular phone 100 has executed positioning by the GPS. Thus, the accuracy of position information transmitted to the digital camera 900 is an accuracy corresponding to position information measured by the GPS. In this example, "within a radius of 10 m" is set. Upon receiving the position information list (step S1630), the digital camera 900 stores position information (latitude and longitude) and accuracy information (within a radius of 10 m) in association with each corresponding image data (step S1631). The position information received in step S1630 is higher in accuracy than the position information received in step S1616. In step S1631, therefore, the position information received in step S1630 overwrites the position information stored in step S1617 (position information of an image shot in step S1607 or S1608). The position information is also stored in association with an image shot in step S1622. The digital camera 900 notifies the cellular phone 100 of the result of processing in step S1629 (step S1632). The cellular phone 100 displays the processing result received in step S1632 as the result of position information data setting processing which has started in step S1623 (step S1633).

One implementation of the present invention when the image capturing apparatus (digital camera 900) and the position information acquiring apparatus (cellular phone 100) are separated has been described. In the embodiment, position information acquisition processing is executed in response to a user operation in the cellular phone 100. However, the same effects as those described above can be obtained even when position information acquisition processing is performed in response to a user operation in the digital camera 900.

A communication sequence when position information acquisition processing is performed in response to a user operation in the digital camera 900 will be exemplified with reference to FIGS. 16A and 16B. Similar to FIGS. 14A and 14B, an initial state assumes that the digital camera 900 and cellular phone 100 have already been connected via a wireless LAN.

First, the user performs an operation in the digital camera 900 to start acquiring position information (step S1801). After this operation, the digital camera 900 transmits a message to the cellular phone 100 to request the start of acquiring position information (step S1802). Upon receiving this message, the cellular phone 100 starts measurement of a moving azimuth and distance by the moving amount measurement unit 240 (step S1803), and position information acquisition processing by the GPS (step S1804). At the time of step S1804, positioning by the GPS has not been completed yet. Then, the cellular phone 100 acquires current position information from the position information server 1113 (step S1805), and stores the acquired current position and current time in association with each other (step S1806). Subsequently, the cellular phone 100 periodically repeats the processes in steps S1805 and S1806. After the start of position information acquisition processing, the cellular phone 100 transmits a response to the position information acquisition start request (step S1802) to the digital camera 900 (step S1807).

The digital camera 900 performs shooting asynchronously from the position information acquisition processing in the cellular phone 100 (steps S1808 and S1809). In each shooting operation, the digital camera 900 stores the shooting time in association with the shot image data.

If a user operation is performed in the digital camera 900 to acquire position information data from the cellular phone 100 (step S1810), the digital camera 900 transmits a position information acquisition request message to the cellular phone 100 (step S1811). The position information acquisition request message designates the current time of the digital camera 900 and a list of times each when position information is to be acquired.

Upon receiving the position information acquisition request message, the cellular phone 100 calculates a difference between the time of the digital camera 900 and the time managed by the cellular phone 100 (step S1812). After that, the cellular phone 100 calculates position information at the time designated by the digital camera 900 based on the position information stored in step S1806, and the moving azimuth and distance which have been measured from step S1803 (step S1813). Upon completion of calculating pieces of position information at all times received in step S1811, the cellular phone 100 transmits position information corresponding to each time and accuracy information of the position to the digital camera 900 (step S1814). At this time, the cellular phone 100 has not executed positioning by the GPS. Thus, the accuracy of position information transmitted to the digital camera 900 is an accuracy corresponding to position information acquired from the position information server 1113. In this example, "within a radius of 1,000 m" is set. Upon receiving the position information list (step S1814), the digital camera 900 stores position information (latitude and longitude) and accuracy information (within a radius of 1,000 m) in association with each corresponding image data (step S1815). In this case, the digital camera 900 stores position information at each time in association with an image shot in step S1808 or S1809.

If the cellular phone 100 successfully acquires position information by the GPS (step S1816), it stores the current position measured by the GPS and the current time in association with each other (step S1817). Thereafter, the cellular phone 100 periodically repeats positioning by the GPS and storage of the positioning result.

If a user operation is performed in the digital camera 900 to acquire position information data again from the cellular phone 100 (step S1819), the digital camera 900 executes the same processes as those in steps 91811 to S1814 (steps S1820 to S1823). At this time, the cellular phone 100 has succeeded in positioning by the GPS (step S1816), and calculates position information at the designated time using the GPS positioning result as a reference (step S1822). Hence, the accuracy of position information transmitted to the digital camera 900 in step S1823 is an accuracy corresponding to position information measured by the GPS. In this example, "within a radius of 10 m" is set.

Upon receiving the position information list (step S1823), the digital camera 900 stores position information (latitude and longitude) and accuracy information (within a radius of 10 m) in association with each corresponding image data (step S1824). The position information received in step S1823 is higher in accuracy than the position information received in step S1814. Hence, in step S1824, the position information received in step S1823 overwrites the position information stored in step S1815 (position information of an image shot in step S1808 or S1809). The position information is also stored in association with an image shot in step S1818.

According to the above-described embodiment, even when the image capturing apparatus (for example, digital camera) and the position information acquiring apparatus (for example, cellular phone) are separated, position information associated with an image shot in the past by the image capturing apparatus can be updated to higher-accuracy position information.

In the embodiment, the digital camera 900 compares the accuracies of pieces of position information to determine whether to update position information associated with a shot image (steps S1502 and S1503). However, the present invention is not limited to this. For example, the cellular phone 100 may also save and manage position information saved in association with a shot image, and transmit only position information to be updated to the digital camera 900.

In the embodiment, the cellular phone 100 performs processing (steps S1405 to S1407) to correct position information stored in the position information server or measured by the GPS. However, the present invention is not limited to this. For example, all positioning information by the GPS and moving amount information measured by the moving amount measurement unit may be transmitted to the digital camera 900 (moving amount acquisition processing) to correct position information by the digital camera 900. Alternatively, the digital camera 900 may measure a moving amount to correct position information measured by the cellular phone 100, based on the moving amount information measured by the digital camera 900.

In the embodiment, when requesting a shot image identifier list of the digital camera 900 (step S1403 or S1610), the cellular phone 100 notifies the digital camera 900 of the time when acquisition of position information started, and the current time. However, the present invention is not limited to this. For example, a time (period) designated by the user by operating the cellular phone 100, or predetermined times such as the time before one hour and the current time may be designated.

The position information setting processing result transmitted in step S1516 or received in step S1410 is the number of images for which save of position information has failed. However, the present invention is not limited to this. For example, it is also possible to notify only the presence/absence of an image for which setting has failed, or notify the cellular phone 100 of a list of the identifiers of failed images. Also, the present invention does not limit the display contents of a processing result displayed by the cellular phone 100 in step S1411. For example, a list of the identifiers of images for which setting has failed may be acquired in step S1410, and an icon representing the setting failure may be displayed on a corresponding thumbnail image based on the list.

The cellular phone 100 may receive a position information setting processing result notification from the digital camera 900 (step S1410), and then determine whether to perform re-setting processing. For example, if the notified number of images for which setting of information processing has failed is equal to or larger than 1 and smaller than the list count transmitted in step S1409, the cellular phone 100 may perform re-setting processing, and if it is equal to the list count transmitted in step S1409, end the processing in FIG. 12.

Third Embodiment

The third embodiment will describe a case in which the image capturing apparatus has the position information acquiring function by a wireless LAN-based positioning system (Wi-Fi Positioning System: WPS). Similar to the second embodiment, the third embodiment will explain an example in which the image capturing apparatus is a digital camera and the position information acquiring apparatus is a cellular phone.

The hardware arrangement and functional blocks of a cellular phone 100 in the third embodiment are the same as those shown in FIGS. 1 and 2 in the first embodiment, and a description thereof will not be repeated.

Figure 17:
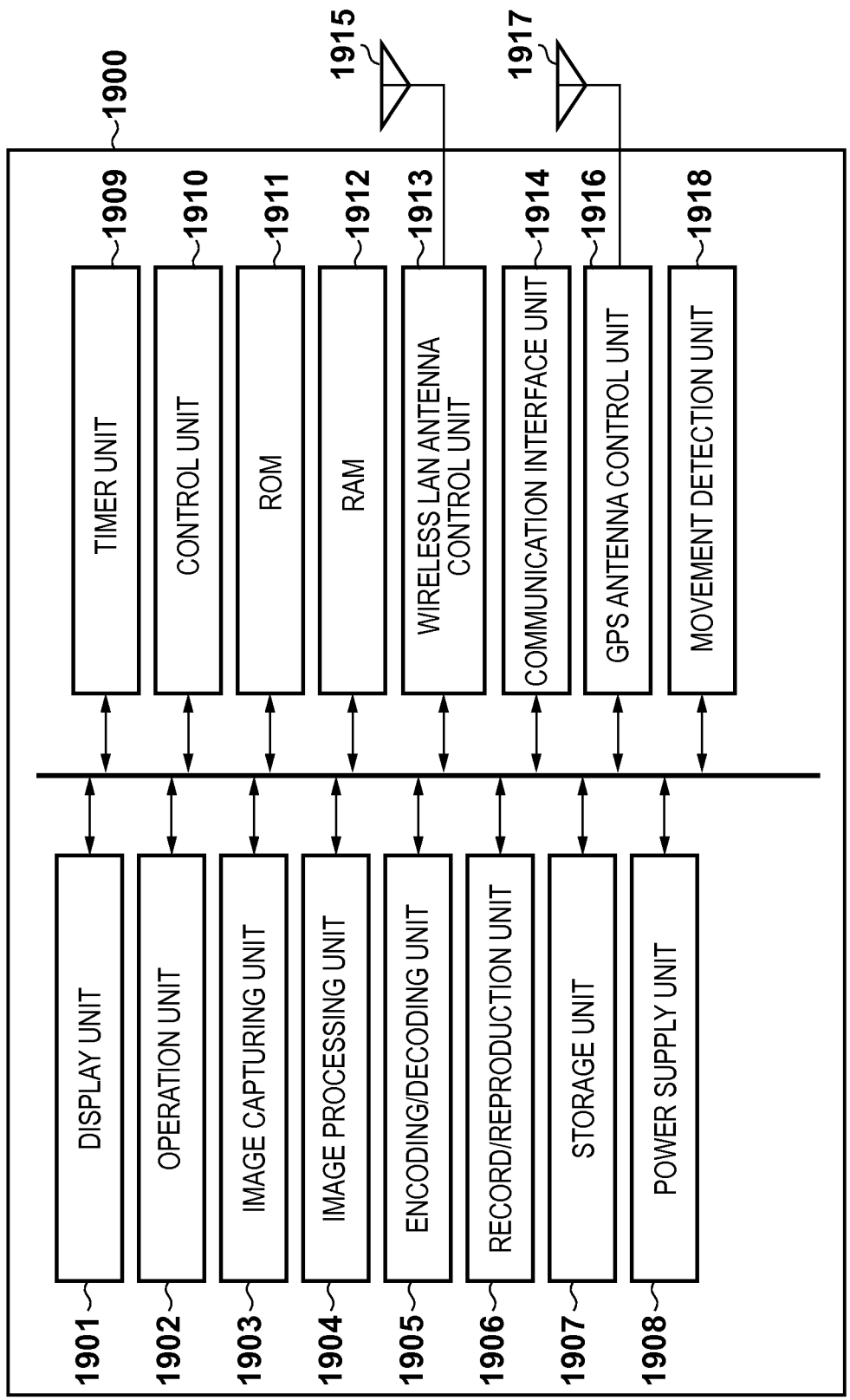
FIG. 17 is a block diagram exemplifying the hardware arrangement of an image capturing apparatus according to the third embodiment.

FIG. 17 is a block diagram showing the hardware arrangement of an image capturing apparatus 1900 (digital camera) which practices the present invention. The digital camera 1900 includes a display unit 1901, operation unit 1902, image capturing unit 1903, image processing unit 1904, encoding/decoding unit 1905, record/reproduction unit 1906, storage unit 1907, power supply unit 1908, timer unit 1909, control unit 1910, ROM 1911, RAM 1912, wireless LAN antenna control unit 1913, communication interface 1914, wireless LAN antenna 1915, GPS antenna control unit 1916, GPS antenna 1917, and movement detection unit 1918. In this case, the processing units including the display unit 1901 and wireless LAN antenna 1915 are the same as those including the display unit 901 and wireless LAN antenna 915 shown in FIG. 7 which is a block diagram showing the hardware arrangement of the image capturing apparatus 900 in the second embodiment, and a description thereof will not be repeated.

The digital camera 1900 in the embodiment further includes the GPS antenna 1917, GPS antenna control unit 1916, and movement detection unit 1918. The GPS antenna control unit 1916 controls the GPS antenna 1917. The GPS antenna 1917 captures radio waves from a GPS satellite. Hence, the digital camera 1900 can singly execute positioning by the GPS.

The movement detection unit 1918 is a hardware component for measuring the relative moving direction and moving distance of the digital camera 1900. Examples of the movement detection unit 1918 are an acceleration sensor and gyroscope. In the embodiment, an acceleration sensor and electronic compass are used as the movement detection unit 1918.

Figure 18:
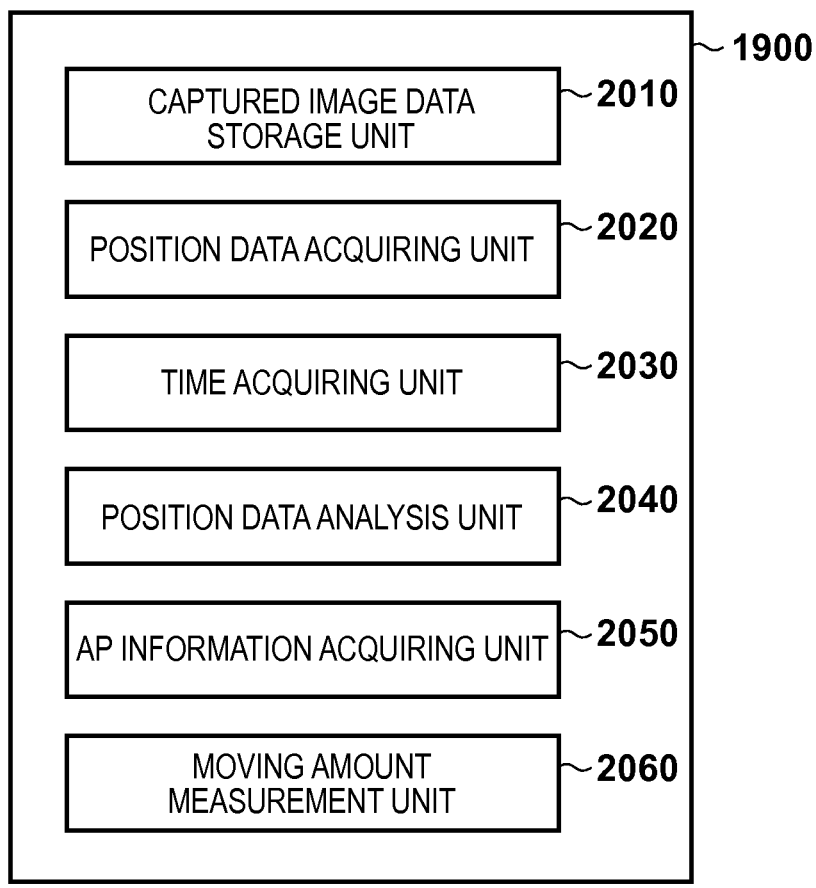
FIG. 18 is a block diagram exemplifying the functional block arrangement of the image capturing apparatus according to the third embodiment.

The functional blocks of the digital camera 1900 will be explained with reference to FIG. 18. In the embodiment, the functional blocks of the digital camera 1900 are stored as programs in the ROM 1911. These functions are implemented by executing the programs by the control unit 1910. Note that some or all of the functional blocks of the digital camera 1900 may be implemented by hardware components.

The digital camera 1900 includes a captured image data storage unit 2010, position data acquiring unit 2020, time acquiring unit 2030, position data analysis unit 2040, AP information acquiring unit 2050, and moving amount measurement unit 2060.

The captured image data storage unit 2010 stores and manages image data, and metadata associated with the image data. The captured image data storage unit 2010 stores and manages, in association with each other, image data captured by the image capturing unit 1903, position information acquired by the position data acquiring unit 2020, image capturing time acquired by the time acquiring unit 2030, and position accuracy information acquired by the position data analysis unit 2040. In addition, the captured image data storage unit 2010 stores and manages, in association with shot image data, the identifier of an access point acquired by the AP information acquiring unit 2050 upon image capturing.

The position data acquiring unit 2020 acquires information about the current position of the digital camera 1900. The position data acquiring unit 2020 has a plurality of functions of acquiring position information.

In the embodiment, the position data acquiring unit 2020 adopts both a method of acquiring position information from the connected cellular phone 100 via the wireless LAN antenna control unit 1913, and a method of acquiring position information by the WPS. When acquiring position information by the WPS, the position data acquiring unit 2020 transmits access point information acquired by the AP information acquiring unit 2050 to an external WPS server, and acquires position information as a response from the WPS server. The time acquiring unit 2030 acquires the current time measured by the timer unit 1909.

The position data analysis unit 2040 analyzes the accuracy of position information acquired by the position data acquiring unit 2020. The accuracy of position information is information for comparing the accuracies of pieces of position information. In the embodiment, the type of method used to acquire position information is handled as the accuracy. More specifically, the accuracy in the embodiment is an information element which has the following five values and is regarded to be higher when these values are smaller:

1. position information measured using the GPS antenna 1917 of the digital camera 1900;
2. position information measured using the GPS antenna 119 of the cellular phone 100;
3. position information measuring by the WPS in the digital camera 1900;
4. position information acquired from an position information server 2115 (to be described later) in the cellular phone 100; and
5. no position information.

However, in the present invention, the index value used as the accuracy of position information is not limited to this. The index suffices to be able to compare the accuracies of pieces of position information with each other. For example, the radius of a position information error indicated in meters may be handled as accuracy information as in the first and second embodiments. The accuracy type may be subdivided based on the number of satellites which have been captured in positioning by the GPS.

The AP information acquiring unit 2050 collects the identifiers of nearby wireless LAN access points via the wireless LAN antenna control unit 1913. By using the movement detection unit 1918 and timer unit 1909, the moving amount measurement unit 2060 measures a relative direction and distance in and by which the digital camera 1900 has moved during a specific period. In the embodiment, the moving amount measurement unit 2060 periodically monitors a measurement value obtained by the acceleration sensor and electronic compass, and calculates a moving direction and distance from a measured acceleration, azimuth, and monitoring period.

Figure 19:
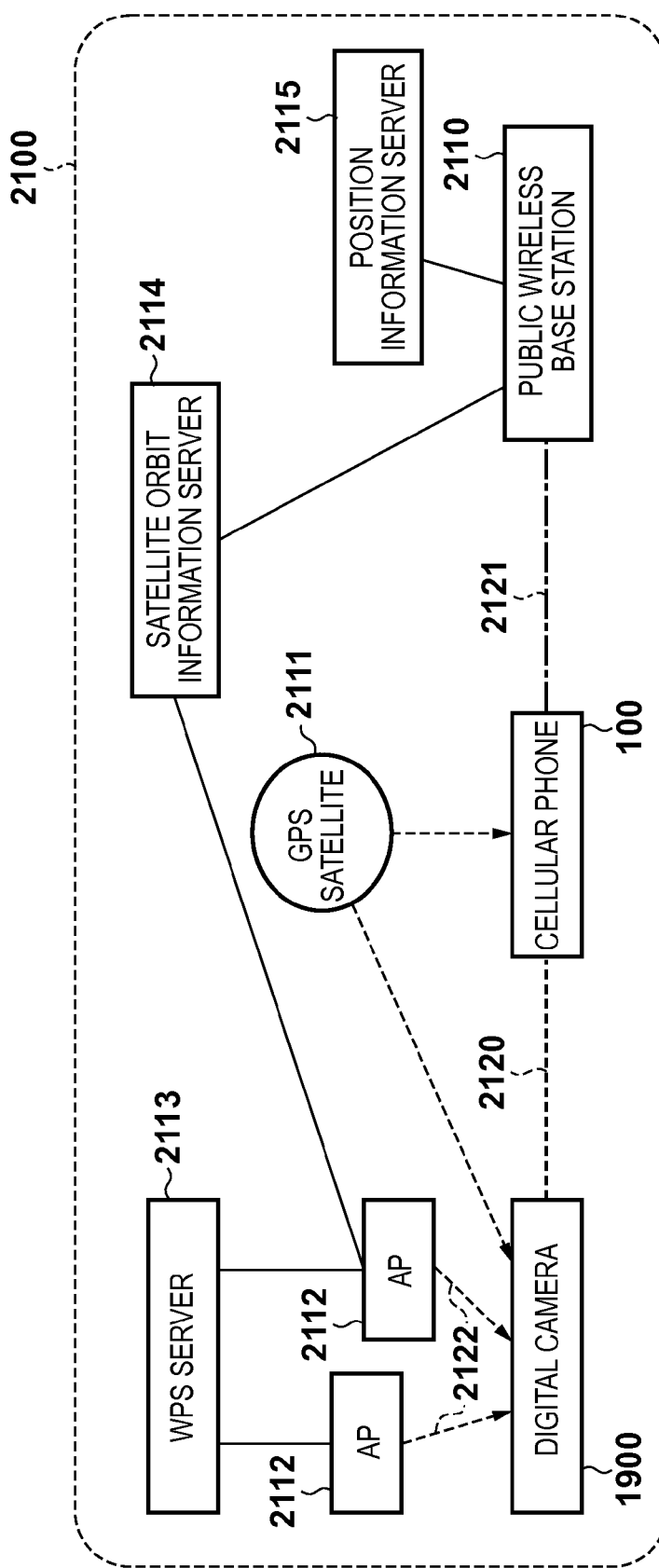
FIG. 19 is a block diagram showing a system arrangement in the third embodiment.

An image capturing system according to the embodiment will be exemplified with reference to FIG. 19. An image capturing system 2100 includes the cellular phone 100 and digital camera 1900.

Processing in the embodiment uses a public wireless base station 2110, a GPS satellite 2111, access points 2112, a WPS server 2113, a satellite orbit information server 2114, and the position information server 2115 shown in FIG. 19. The cellular phone 100 and digital camera 1900 communicate with each other by wireless LAN communication 2120.

The cellular phone 100 performs public network wireless communication 2121 with the public wireless base station 2110. The cellular phone 100 can receive radio waves from the GPS satellite 2111. The public wireless base station 2110 is connected to the position information server 2115 and satellite orbit information server 2114. The position information server 2115 holds the installation position of the public wireless base station 2110, and notifies the cellular phone 100 of it. The satellite orbit information server 2114 provides orbit information of the GPS satellite 2111. The cellular phone 100 can be connected to the position information server 2115 and satellite orbit information server 2114 via the public wireless base station 2110.

The digital camera 1900 receives wireless LAN wireless signals 2122 transmitted from the access points 2112 to collect information about the nearby access points. The digital camera 1900 transmits the collected access point information to the WPS server 2113, and can acquire position information as a response from the WPS server 2113. The WPS server 2113 holds the installation positions of the access points 2112. The digital camera 1900 can also receive radio waves from the GPS satellite 2111, similar to the cellular phone 100. The digital camera 1900 can be connected to the satellite orbit information server 2114 via the access point 2112 to acquire orbit information of the GPS satellite 2111.

An operation sequence in the digital camera 1900 according to the embodiment will be explained with reference to the flowcharts of FIGS. 20 to 22.

FIG. 20 is a flowchart showing an operation sequence at the start of position information acquisition processing in the digital camera 1900. The embodiment assumes that this processing is executed when the digital camera 1900 is turned on, the user executes an operation to start the use of position information, or the digital camera 1900 receives a message from an external apparatus.

After the start of position information acquisition processing, in step S2201, the digital camera 1900 transmits a position information acquisition start request to the cellular phone 100 connected via the wireless LAN, and instructs the cellular phone 100 to start position information acquisition processing.

In step S2202, the digital camera 1900 stores the current time as the time when position information acquisition processing started.

In step S2203, the digital camera 1900 starts measuring a moving amount using the moving amount measurement unit 2060. After that, the digital camera 1900 periodically records a relative moving direction and moving amount from the current time. The moving amount data recorded here is the same as that in FIG. 5A described in the first embodiment, and a description thereof will not be repeated.

In steps S2204 to S2207, the digital camera 1900 acquires GPS satellite orbit information in order to measure the current position using the GPS. First, in step S2204, the digital camera 1900 requests satellite orbit data of the satellite orbit information server 2114.

Then, in step S2205, the digital camera 1900 determines whether position information can be acquired from the satellite orbit information server 2114. If the digital camera 1900 determines that position information can be acquired from the satellite orbit information server 2114 (YES in step S2205), the process advances to step S2206. If the digital camera 1900 determines that no position information can be acquired from the satellite orbit information server 2114 (NO in step S2205), the process advances to step S2207.

In step S2206, the digital camera 1900 acquires satellite orbit data from the satellite orbit information server 2114, and performs positioning by the GPS using this data.

In step S2207, the digital camera 1900 acquires satellite orbit data originated from the GPS satellite 2111. This processing generally takes several min. For this reason, the request to the satellite orbit information server in step S2204 may be repeated until, for example, satellite orbit data is acquired from the GPS satellite.

After that, the processing in FIG. 20 ends.

Figure 21B:
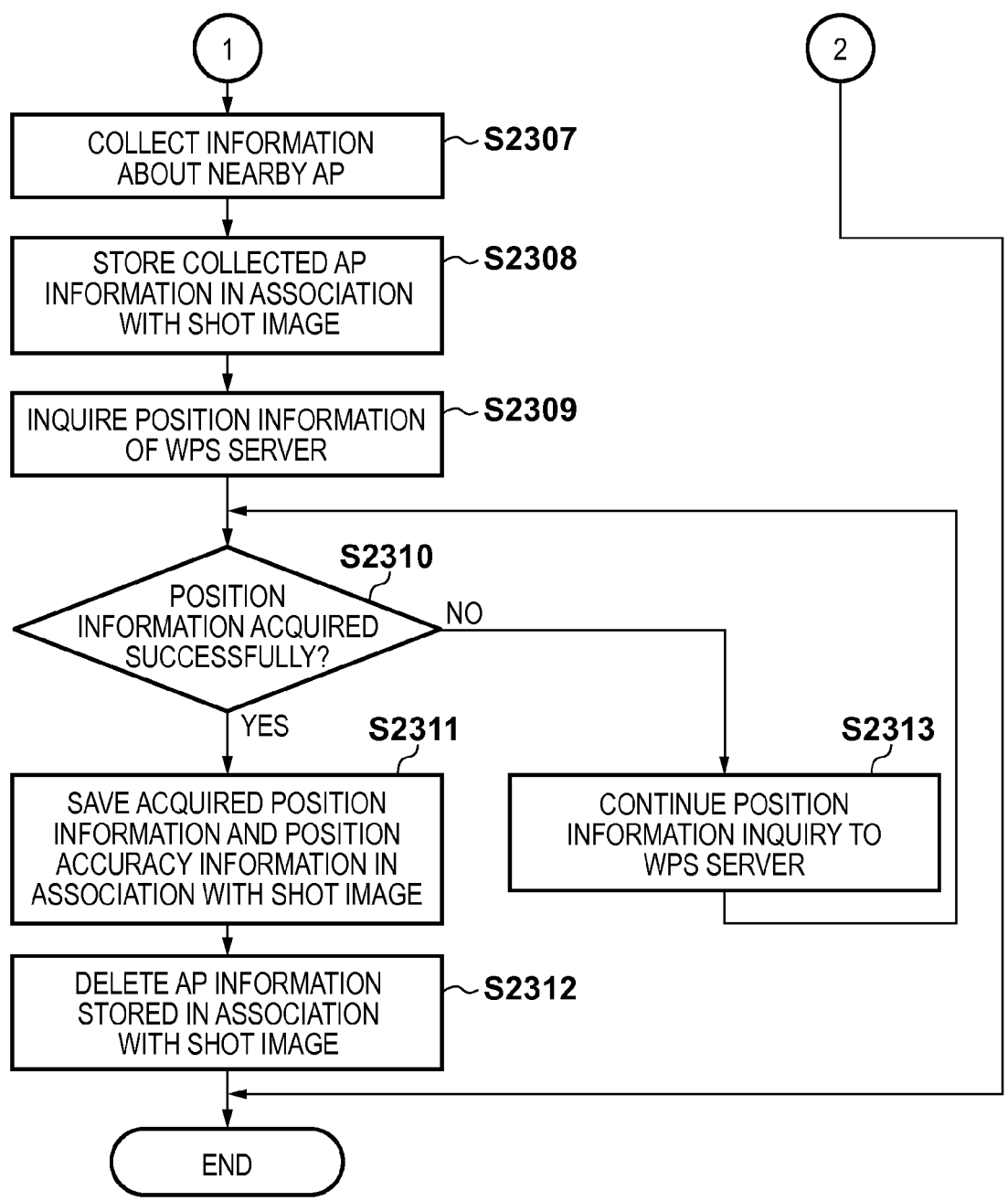

FIGS. 21A and 21B are flowcharts showing an operation sequence when the digital camera 1900 shoots an image. In step S2301, an image is shot by a user operation, timer processing, or the like. In step S2302, the digital camera 1900 tries to acquire GPS information using the GPS antenna 1917 of the digital camera 1900. In step S2303, the digital camera 1900 determines whether acquisition of GPS information has succeeded. If the digital camera 1900 determines that acquisition of GPS information has succeeded (YES in step S2303), the process advances to step S2315. If the digital camera 1900 determines that acquisition of GPS information has failed (NO in step S2303), the process advances to step S2304.

In step S2304, the digital camera 1900 tries to acquire current position information and accuracy information of the position information from the cellular phone 100. More specifically, the digital camera 1900 transmits, to the cellular phone 100, the current time and a position information acquisition request message which designates the current time as the positioning time of position information to be acquired. As a response message, the digital camera 1900 receives current position information and the accuracy of the position information.

In step S2305, the digital camera 1900 determines the type of acquired position information. If the digital camera 1900 determines that it has not acquired position information from the cellular phone 100 ("acquisition failure" in step S2305), the process advances to step S2306. If the digital camera 1900 determines that the position information acquired from the cellular phone 100 is position information acquired from the position information server ("position information server" in step S2305), the process advances to step S2314. If the digital camera 1900 determines that it has acquired the position information by the GPS from the cellular phone 100 ("GPS" in step S2305), the process advances to step S2315.

In step S2306, the digital camera 1900 saves the current time and shot image in association with each other. In steps S2307 to S2313, the digital camera 1900 performs position information acquisition processing by a WPS.

After the start of position information acquisition processing by the WPS, in step S2307, the digital camera 1900 collects information about wireless LAN access points present around the digital camera 1900. The access point information to be collected includes the MAC address of an access point, the SSID (Service Set Identifier) of a wireless LAN, and the radio field intensity.

Upon completion of collecting access point information in step S2307, the digital camera 1900 stores the collected access point information and shot image in association with each other in step S2308.

In step S2309, the digital camera 1900 inquires position information of the WPS server 2113 using the access point information stored in step S2308. In step S2310, the digital camera 1900 determines whether it has acquired position information from the WPS server 2113. If the digital camera 1900 determines that it has acquired position information from the WPS server 2113 (YES in step S2310), the process advances to step S2311. If the digital camera 1900 determines that it has not acquired position information from the WPS server 2113 (NO in step S2310), the process advances to step S2313.

In step S2311, the digital camera 1900 saves the acquired position information, position accuracy information, and shot image in association with each other. In step S2312, the digital camera 1900 deletes the access point information stored in step S2309. The process then ends.

In step S2313, the digital camera 1900 continues position information acquisition processing with respect to the WPS server 2113 using the AP information stored in step S2308. After the processing in step S2313, position information acquisition processing with respect to the WPS server 2113 may be repeated in a short cycle or a long cycle such as "every other day". The position information acquisition processing may be performed in response to a specific event or user operation such as power-on of the digital camera 1900. If the digital camera 1900 acquires position information from the WPS server 2113 later (YES in step S2310), it saves the position accuracy information and shot image in association with each other in step S2311, and in step S2312, deletes access point information stored in step S2309.

In step S2314, the digital camera 1900 saves the acquired position information, accuracy information of the position information, and the current time in association with the shot image. Thereafter, the process advances to step S2307.

In step S2315, the digital camera 1900 saves the position information acquired in step S2302, accuracy information of the position information, and the current time in association with the shot image. The process then ends. Accordingly, the processing in FIGS. 21A and 21B ends.

Figure 22:
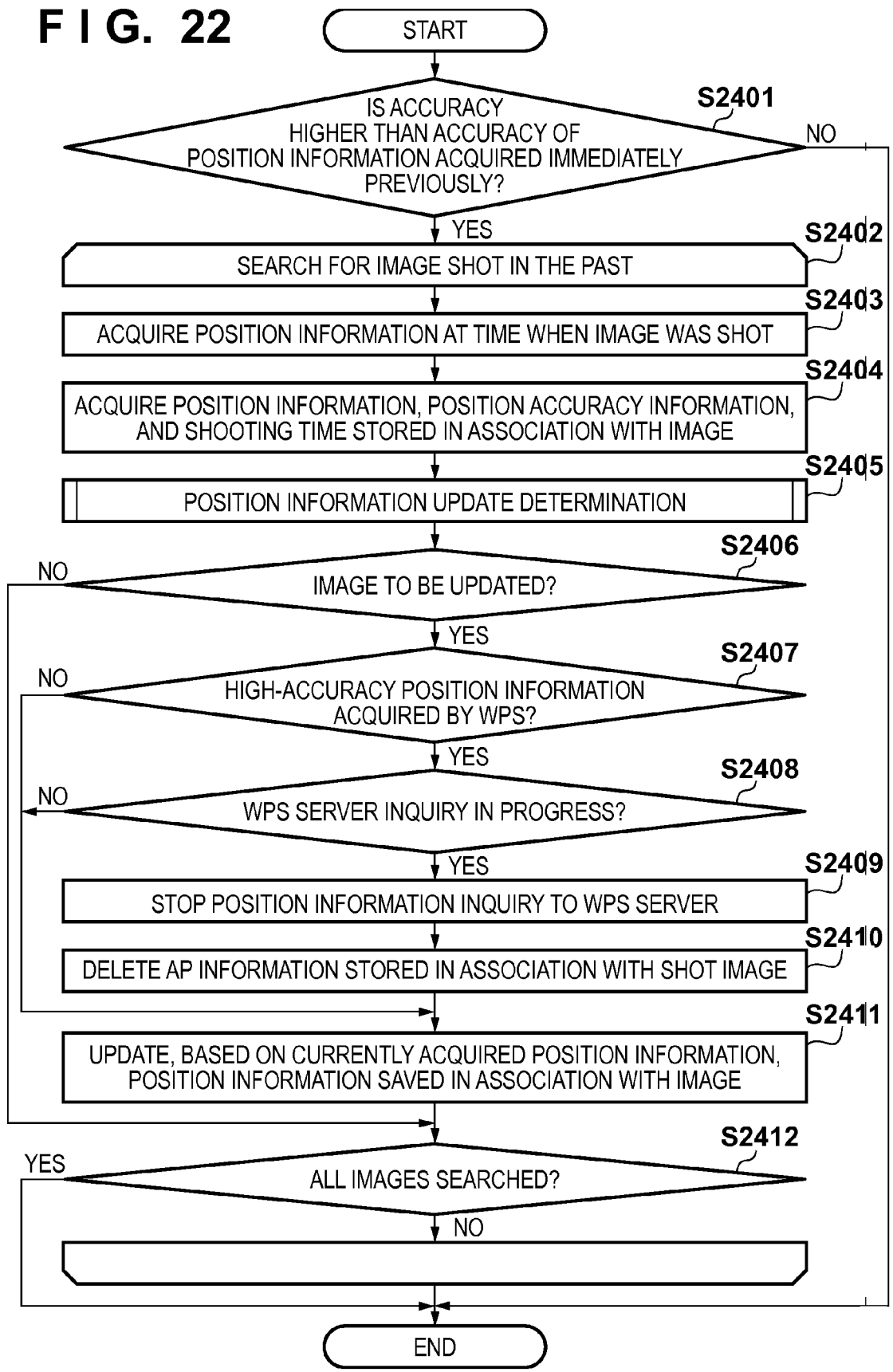
FIG. 22 is a flowchart showing an operation sequence by the image capturing apparatus in the third embodiment.

FIG. 22 is a flowchart showing a processing sequence when the digital camera 1900 successfully acquires position information. More specifically, the digital camera 1900 executes this processing in response to one of the following events:

1. position information has been acquired from the cellular phone 100 by position information acquisition request processing;
2. positioning using the GPS antenna 1917 of the digital camera 1900 has succeeded for the first time after the start of position information acquisition; and
3. position information has been acquired from the WPS server 2113.

In step S2401, upon acquiring position information, the digital camera 1900 determines whether the accuracy of the currently acquired position information is higher than that of previously acquired position information. If the digital camera 1900 determines that the accuracy of the currently acquired position information is higher than that of previously acquired position information (YES in step S2401), the process advances to step S2402. If the digital camera 1900 determines that the accuracy of the currently acquired position information is equal to or lower than that of previously acquired position information (NO in step S2401), the process ends.

In steps S2402 to S2411, the digital camera 1900 performs update processing for position information which has been saved in association with an image shot in the past. The digital camera 1900 performs processes in steps S2403 to S2411 for each image shot in the past. The embodiment targets all images shot up to now after the start of acquiring position information stored in step S2202 of FIG. 20.

In step S2403, the digital camera 1900 acquires position information at the time when the target image was shot. For example, when the processing shown in FIG. 22 starts in response to acquisition of position information from the cellular phone 100, the digital camera 1900 acquires position information upon shooting by transmitting a position information acquisition request to the cellular phone 100 in step S2403. When this processing starts in response to acquisition of position information by the GPS or WPS of the digital camera 1900, a value obtained by correcting newly acquired position information by a moving direction and distance measured by the moving amount measurement unit 2060 is set as position information upon shooting. Note that the method of calculating a position upon shooting using a moving amount measured by the moving amount measurement unit 2060 is the same as that described with reference to FIG. 6 in the first embodiment, and a description thereof will not be repeated.

In step S2404, the digital camera 1900 acquires position information, accuracy information of the position information, and the shooting time which are stored in association with the target image.

In step S2405, the digital camera 1900 determines, based on the information acquired in step S2404, whether to update the position information associated with the image. This determination method also executes the same processing as that described in detail with reference to FIG. 6 in the first embodiment, and a description thereof will not be repeated. Similar to the first embodiment, the determination method in step S2405 is not limited to processing in FIG. 6. If the digital camera 1900 determines to update the position information (YES in step S2406), the process advances to step S2407. If the digital camera 1900 determines not to update the position information (NO in step S2406), the process advances to step S2412.

In steps S2407 to S2410, the digital camera 1900 performs stop processing for position information inquiry processing to the WPS server 2113. First, in step S2407, the digital camera 1900 determines whether the accuracy of currently acquired position information is higher than that of positioning information by the WPS. If the digital camera 1900 determines that the accuracy of currently acquired position information is higher than that of positioning information by the WPS (YES in step S2407), the process advances to step S2408. If the digital camera 1900 determines that the accuracy of currently acquired position information is equal to or lower than that of positioning information by the WPS (NO in step S2407), the process advances to step S2411 without stopping the inquiry processing to the WPS server 2113.

In step S2408, the digital camera 1900 determines whether the inquiry to the WPS server 2113 about acquisition of position information corresponding to an image to be updated is in progress. If the digital camera 1900 determines whether the inquiry to the WPS server 2113 is in progress (YES in step S2408), the process advances to step S2409. If the digital camera 1900 determines whether the inquiry to the WPS server 2113 is not in progress (NO in step S2408), the process advances to step S2411.

In step S2409, the digital camera 1900 stops position information inquiry processing to the WPS server 2113. In step S2410, the digital camera 1900 deletes access point information stored in association with the image. In step S2411, the digital camera 1900 updates, based on position information acquired in step S2403, position information and accuracy information stored in association with the image.

In step S2412, the digital camera 1900 determines whether all images shot in the past have been searched. If the digital camera 1900 determines that all images shot in the past have been searched (YES in step S2412), the process ends. If the digital camera 1900 determines that not all images shot in the past have been searched (NO in step S2412), the process is looped from step S2402. After that, the processing in FIG. 22 ends.

Next, the operation of the cellular phone 100 in the embodiment will be described. Processing when the cellular phone 100 receives a position information acquisition start request transmitted from the digital camera 1900 in step S2201 is the same as the processing of FIG. 10 described in the second embodiment, and a description thereof will not be repeated.

Processing when the cellular phone 100 receives a position information acquisition request transmitted from the digital camera 1900 in step S2304 of FIGS. 21A and 21B will be described in detail with reference to FIG. 23. In accordance with the position information acquisition request message, the cellular phone 100 acquires the current time in the digital camera 1900 and the positioning time of position information requested by the digital camera 1900.

In step S2501, the cellular phone 100 calculates a difference between the time of the digital camera 1900 that has been received by the position information acquisition request message, and the time managed by the cellular phone 100. In step S2502, the cellular phone 100 selects, from records having a highest accuracy in a stored position information list, a record for which positioning was performed at the time closest to the time designated by the digital camera 1900. The cellular phone 100 sets position information of this record as a reference position.

In step S2503, the cellular phone 100 calculates a moving direction and distance from the positioning time of the reference position up to the time designated by the digital camera 1900 by referring to the moving amount information exemplified in FIG. 5A.

In step S2504, the cellular phone 100 sets, as a position at the time designated by the digital camera 1900, a point which is moved from the reference position set in step S2502 by the distance in the moving direction that have been calculated in step S2503.

Finally, in step S2505, the cellular phone 100 transmits the position information calculated in step S2504, and the accuracy of the position information to the digital camera 1900. In the embodiment, the accuracy information transmitted to the digital camera 1900 is an accuracy value in the position information list data set as a reference in step S2502.

If the cellular phone 100 successfully acquires position information, it transmits, to the digital camera 1900, a position information acquisition notification which designates measured position information and the accuracy of the position information (not shown). As a result, the processing in FIG. 23 ends.

Figure 24A:
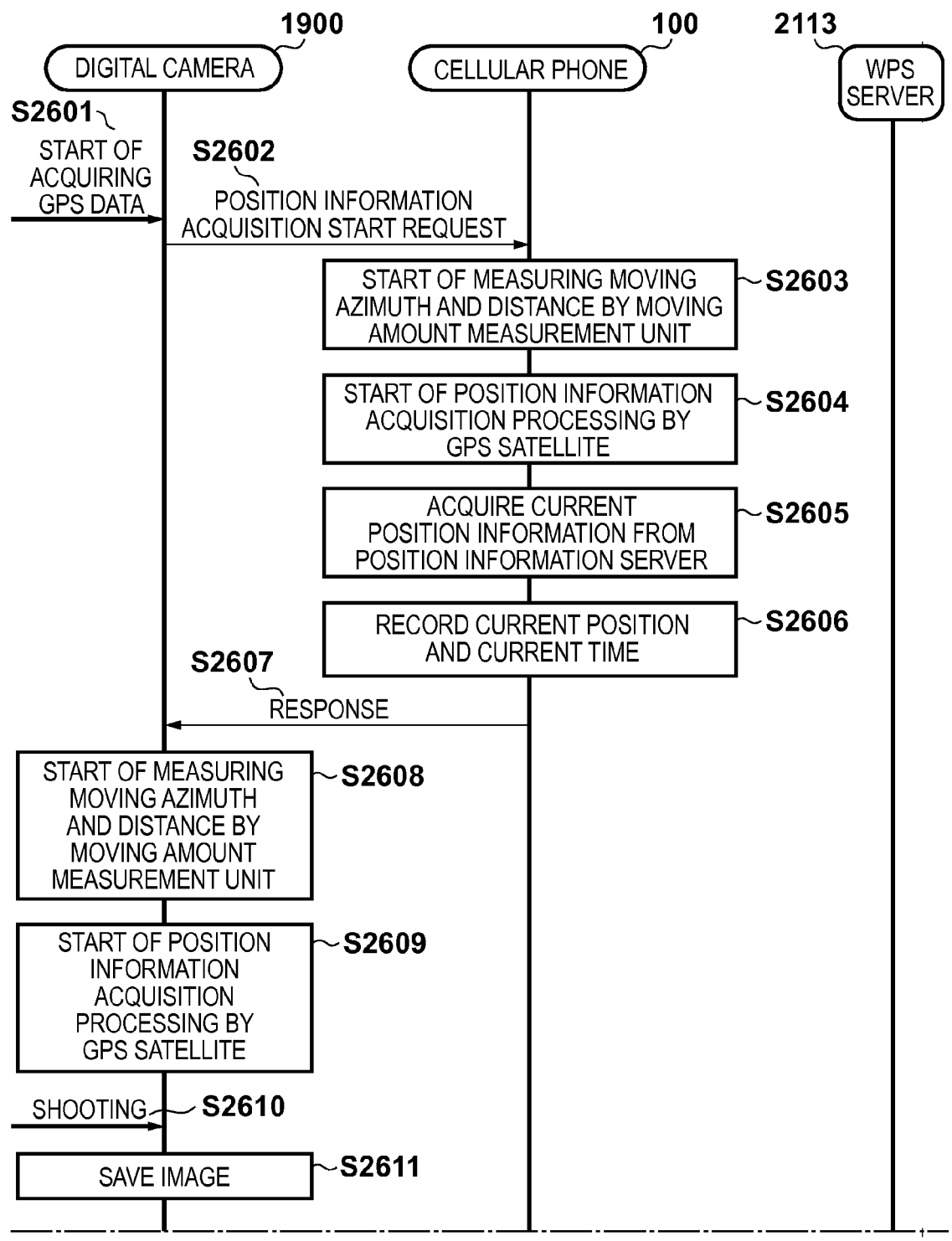
FIGS. 24A and 24B are sequence charts exemplifying an operation in the third embodiment.
Figure 24B:
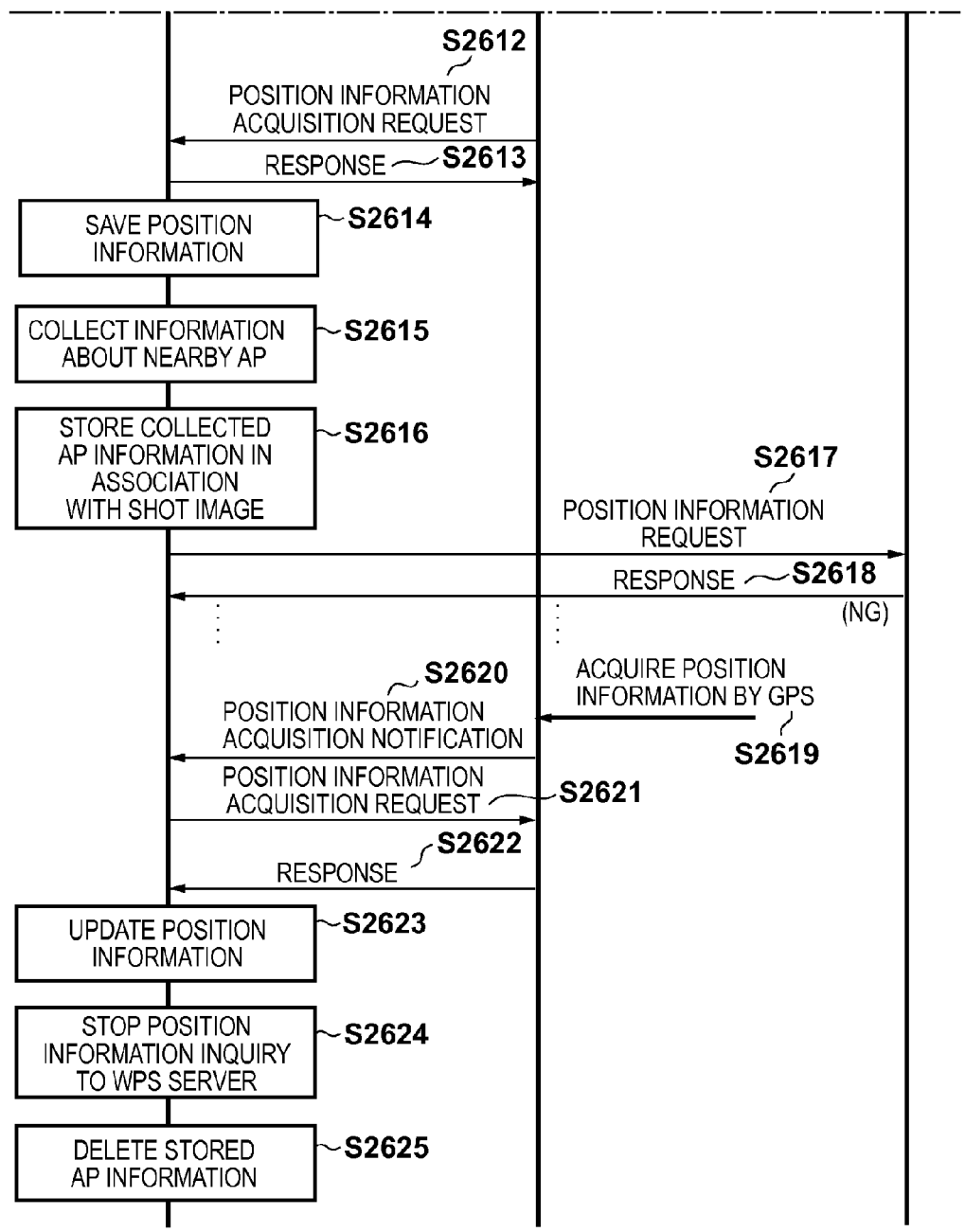

A communication sequence between the digital camera 1900 and the cellular phone 100 in the embodiment will be exemplified with reference to FIGS. 24A and 24B. An initial state assumes that the digital camera 1900 and cellular phone 100 have already been connected via a wireless LAN.

First, the user performs an operation in the digital camera 1900 to start the use of position information (step S2601). After this operation, the digital camera 1900 transmits a position information acquisition start request to the cellular phone 100 to request the cellular phone 100 to start acquiring position information (step S2602).

Upon receiving the position information acquisition start request, the cellular phone 100 starts measurement of a moving azimuth and distance by a moving amount measurement unit 240 (step S2603), and position information acquisition processing by the GPS (step S2604). At the time of step S2604, positioning by the GPS has not been completed yet. Then, the cellular phone 100 acquires current position information from the position information server 2115 (step S2605), and stores the acquired current position and current time in association with each other (step S2606). Subsequently, the cellular phone 100 periodically repeats the processes in steps S2605 and S2606. After the start of position information acquisition processing, the cellular phone 100 sends back a response to the position information acquisition start request (step S2602) to the digital camera 1900 (step S2607).

Upon receiving the response in step S2607, the digital camera 1900 starts measurement of a moving azimuth and distance by the moving amount measurement unit 2060 (step S2608), and position information acquisition processing by the GPS (step S2609). At the time of step S2609, positioning by the GPS has not been completed yet, similar to the cellular phone 100.

If the digital camera 1900 executes a shooting operation (step S2610), it saves the shot image (step S2611), and transmits a position information acquisition request to the cellular phone 100 (step S2612). Upon receiving the position information acquisition request, the cellular phone 100 transmits position information held by it and the accuracy of the position information to the digital camera 1900 (step S2613). The position information transmitted to the digital camera 1900 is a value obtained by correcting position information measured in step S2605 by the moving azimuth and distance measured by the moving amount measurement unit 240. Also, the accuracy of the position information transmitted in step S2613 is a value representing that position information has been received from the position information server 2115.

Upon receiving the response in step S2613, the digital camera 1900 stores the acquired position information, accuracy information of the position information, and the current time in association with the image saved in step S2611 (step S2614). Subsequently, the digital camera 1900 searches for nearby access points, and collects information about the respective access points (step S2615). The access point information includes the MAC address of an access point, the SSID, and the radio field intensity. The digital camera 1900 saves the access point information collected in step S2615 in association with the shot image (step S2616), and inquires position information of the WPS server 2113 using the collected access point information (step S2617). The WPS server 2113 measures the current position of the digital camera 1900 using the access point information received in step S2617, and notifies the digital camera 1900 of the measurement result (step S2618).

If the digital camera 1900 successfully acquires position information in step S2618, it saves the position information in association with the shot image. This example assumes that the WPS server 2113 has failed in measurement of position information. If acquisition of position information from the WPS server 2113 has failed, the digital camera 1900 periodically continues position information acquisition request processing (steps S2617 and S2618) to the WPS server 2113.

If the cellular phone 100 successfully acquires position information using the GPS (step S2619), it notifies the digital camera 1900 of the acquired position information and successful acquisition of position information using the GPS (step S2620). Upon receiving the notification, the digital camera 1900 transmits a position information acquisition request to the cellular phone 100 (step S2621) to request position information upon shooting in step S2610 of the cellular phone 100. Upon receiving the request in step S2621, the cellular phone 100 calculates position information at the time (upon execution of step S2610) designated by the digital camera 1900 based on the position information acquired in step S2619, and transmits it to the digital camera 1900 (step S2622).

Upon receiving the response in step S2622, the digital camera 1900 updates, based on the value received in step S2622, the position information and accuracy information of the position information that are stored in association with the image shot in step S2610 (step S2623). The digital camera 1900 stops the position information request processing (steps S2617 and S2618) to the WPS server 2113 (step S2624), and deletes the AP information stored in step S2616 (step S2625).

One implementation of the present invention when the image capturing apparatus (digital camera) has the position information acquiring function by a wireless LAN-based positioning system (Wi-Fi Positioning System: WPS) has been described. In the embodiment, position information acquisition processing is executed in response to a user operation in the digital camera 1900. However, the same effects as those described above can be obtained even when position information acquisition processing is performed in response to a user operation in the cellular phone 100.

Figure 25B:
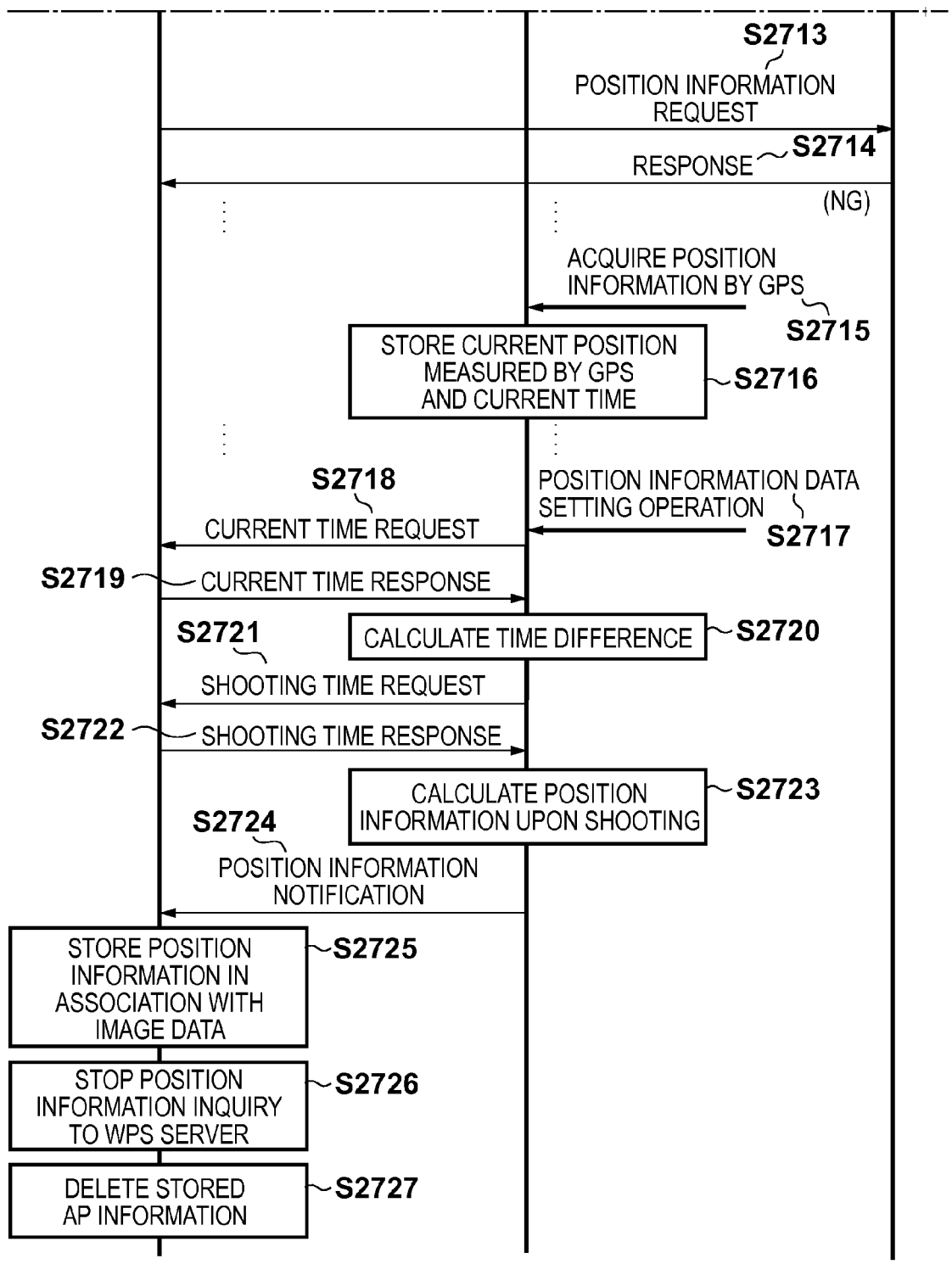

A communication sequence when position information acquisition processing is performed in response to a user operation in the cellular phone 100 will be exemplified with reference to FIGS. 25A and 25B.

Similar to FIGS. 24A and 24B, an initial state assumes that the digital camera 1900 and cellular phone 100 have already been connected via a wireless LAN. First, the user performs an operation in the cellular phone 100 to start the use of position information (step S2701). In response to this, the cellular phone 100 starts measurement of a moving azimuth and distance by the moving amount measurement unit 240 (step S2702), and position information acquisition processing by the GPS (step S2703). At the time of step S2703, positioning by the GPS has not been completed yet. Then, the cellular phone 100 acquires current position information from the position information server 2115 (step S2704), and stores the acquired current position and current time in association with each other (step S2705). Subsequently, the cellular phone 100 periodically repeats the processes in steps S2704 and S2705. After the start of position information acquisition processing, the cellular phone 100 transmits a position information acquisition start notification to the digital camera 1900 (step S2706).

Upon receiving the position information acquisition start notification, the digital camera 1900 starts measurement of a moving azimuth and distance by the moving amount measurement unit 2060 of the digital camera 1900 (step S2707), and position information acquisition processing by the GPS (step S2708). At the time of step S2708, positioning by the GPS has not been completed yet, similar to the cellular phone 100.

If the digital camera 1900 executes a shooting operation (step S2709), it saves the shot image (step S2710), and tries to acquire position information to be saved in association with the shot image. At this time, position information by the GPS has not been acquired, so the digital camera 1900 tries to acquire position information by the WPS. The digital camera 1900 searches for nearby access points to collect information about the respective access points (step S2711), and saves it in association with the shot image (step S2712). Then, the digital camera 1900 inquires position information of the WPS server 2113 using the collected access point information (step S2713), and receives the positioning result (step S2714). If the digital camera 1900 successfully acquires position information in step S2714, it saves the position information in association with the shot image. This example assumes that the WPS server 2113 has failed in measurement of position information. If acquisition of position information from the WPS server 2113 has failed, the digital camera 1900 periodically continues position information acquisition request processing (steps S2713 and S2714) to the WPS server 2113.

If the cellular phone 100 successfully acquires position information by the GPS (step S2715), it stores the current position measured by the GPS and the current time in association with each other (step S2716). Subsequently, the cellular phone 100 periodically repeats positioning by the GPS and storage of the positioning result.

If a user operation is performed in the cellular phone 100 to transmit position information data to the digital camera 1900 (step S2717), the cellular phone 100 requests the current time of the digital camera 1900 (step S2718). Upon receiving the current time request (step S2718), the digital camera 1900 sends back the current time managed by it as a response to the cellular phone 100 (step S2719). After acquiring the current time from the digital camera 1900 (step S2719), the cellular phone 100 calculates a difference between the acquired current time and the current time managed by the cellular phone

100 (step S2720). Then, the cellular phone 100 requests a list of the identifiers and shooting times of images which have been shot until now after the start of acquiring position information in step S2701 (step S2721). In response to this request, the digital camera 1900 sends back a list of image identifiers and shooting times to the cellular phone 100 (step S2722). Upon receiving this, the cellular phone 100 calculates position information upon shooting based on the position information stored in step S2716, and the moving azimuth and distance which have been measured from step S2702 (step S2723). Upon completion of calculating pieces of position information at all shooting times received in step S2722, the cellular phone 100 transmits position information corresponding to each shooting time and accuracy information of the position to the digital camera 1900 (step S2724).

Upon receiving the position information list (step S2724), the digital camera 1900 stores position information (latitude and longitude) and accuracy information in association with each corresponding image data (step S2725). In this example, the digital camera 1900 stores position information and accuracy information in association with an image shot in step S2709. The digital camera 1900 stops the position information request processing (steps S2713 and S2714) to the WPS server 2113 (step S2726), and deletes the AP information stored in step S2712 (step S2727).

According to the third embodiment, in addition to the effects described in the first and second embodiments, the period during which position information acquisition processing by the WPS continues can be automatically determined in an implementation in which position information is acquired using the WPS. This can reduce power of the device which executes the WPS.

In the embodiment, the digital camera 1900 connects to the WPS server 2113 via the access point 2112. However, the present invention is not limited to this. For example, the digital camera 1900 may be connected to the WPS server 2113 via the public network wireless communication 2121 using the cellular phone 100.

In the embodiment, the digital camera 1900 starts a position information inquiry to the WPS server 2113 upon completion of collecting nearby access point information. However, the present invention is not limited to this. For example, the digital camera 1900 may start a position information inquiry to the WPS server 2113 upon detecting that the digital camera 1900 has connected to the Internet.

In the embodiment, the device which executes the WPS is the digital camera 1900. However, the present invention is not limited to this. For example, the cellular phone 100 may execute the WPS.

Typical embodiments of the present invention have been exemplified. However, the present invention is not limited to the specification and embodiments shown in the drawings, and can be modified and practiced without departing from the scope of the invention.

As the function of acquiring position information, the first to third embodiments have exemplified acquisition of the position of a wireless base station by the GPS, WPS, and position information server. However, the position information acquiring function in the present invention is not limited to this.

In the first to third embodiments, position information is formed from the latitude and longitude. However, position information in the present invention is not limited to this. For example, position information also includes the altitude, address, and azimuth.

The present invention can increase the accuracy of stored position information when storing position information upon image capturing in association with a captured image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-122596 filed on May 31, 2011, and 2012-115904, filed May 21, 2012, which are hereby incorporated by reference herein in their entirety.

What is claimed is:

1. An apparatus comprising:
   a processor; and
   a memory including instructions that, when executed by the processor, cause the apparatus to:
      start a first mode for acquiring position information of the apparatus upon image capturing;
      acquire first position information of the apparatus using the first mode for acquiring position information;
      store image data generated by the image capturing and the first position information in the memory in association with each other;
      acquire second position information of the apparatus using a second mode for acquiring position information, wherein the second position information is higher in accuracy than the first position information;
      stop the first mode for acquiring position information of the apparatus, in accordance with the acquired second position information; and
      store the second position information in the memory in association with the image data in a case where the second position information is acquired after the image data is stored.

2. The apparatus according to claim 1, wherein the second position information is stored in the memory in association with the image data by overwriting the first position information which is stored in the memory in association with the image data.

3. The apparatus according to claim 1, further comprising an image capturing unit configured to generate image data by image capturing,
   wherein the first position information is acquired upon image capturing by the image capturing unit, and
   wherein, after the first position information is acquired, the second position information is acquired upon image capturing by the image capturing unit.

4. The apparatus according to claim 1, wherein, when the second position information is acquired within a predetermined time after the image capturing, the second position information is stored in the memory to be associated with the image data.

5. The apparatus according to claim 1, wherein the instructions further cause the apparatus to determine an error range of the first position information, and wherein, when a position indicated by the second position information falls within the determined error range the second position information is stored in the memory to be associated with the image data.

6. The apparatus according to claim 1, wherein the instructions further cause the apparatus to detect movement of the apparatus, and wherein, when movement of the apparatus is not detected after image capturing by an image capturing unit, the second position information is stored in the memory to be associated with the image data.

7. The apparatus according to claim 1, wherein the instructions further cause the apparatus to:

measure a moving amount by which an image capturing apparatus has moved; and correct the acquired second position information based on the measured moving amount, wherein the corrected second position information is stored in the memory in association with the image data.

8. A method for controlling an apparatus, comprising:

starting a first mode for acquiring position information of the apparatus upon image capturing;

acquiring first position information of the apparatus using the first mode for acquiring position information;

storing image data generated by the image capturing and the first position information in a memory in association with each other;

acquiring second position information of the apparatus using a second mode for acquiring position information, wherein the second position information is higher in accuracy than the first position information;

stopping the first mode for acquiring position information of the apparatus, in accordance with the acquired second position information; and storing the second position information in the memory in association with the image data in a case where the second position information is acquired after the image data is stored.

9. A non-transitory computer-readable storage medium storing a computer program including instructions that, when executed by a processor, cause an apparatus to:

start a first mode for acquiring position information of the apparatus upon image capturing;

acquire first position information of the apparatus using the first mode for acquiring position information;

store image data generated by the image capturing and the first position information in a memory in association with each other;

acquire second position information of the apparatus using a second mode for acquiring position information, wherein the second position information is higher in accuracy than the first position information;

stop the first mode for acquiring position information of the apparatus, in accordance with the acquired second position information; and store the second position information in the memory in association with the image data in a case where the second position information is acquired after the image data is stored.

10. The apparatus according to claim 1, wherein the second position information is stored in the memory in association with the image data according to a time difference between a time when the image data is generated and a time when the second position information is acquired.

* * * * *